United States Patent
Grgich et al.

(10) Patent No.: US 11,480,690 B2
(45) Date of Patent: Oct. 25, 2022

(54) SYSTEM AND METHOD FOR SATELLITE POSITIONING

(71) Applicant: Swift Navigation, Inc., San Francisco, CA (US)

(72) Inventors: Paul Grgich, San Francisco, CA (US); Lloyd Maza, San Francisco, CA (US); Philippe Brocard, San Francisco, CA (US)

(73) Assignee: Swift Navigation, Inc., San Francisco, CA (US)

( * ) Notice: Subject to any disclaimer, the term of this patent is extended or adjusted under 35 U.S.C. 154(b) by 0 days.

(21) Appl. No.: 17/343,327

(22) Filed: Jun. 9, 2021

(65) Prior Publication Data

US 2021/0382181 A1    Dec. 9, 2021

Related U.S. Application Data

(60) Provisional application No. 63/036,748, filed on Jun. 9, 2020.

(51) Int. Cl.
    *G01S 19/41*      (2010.01)
    *G01S 19/44*      (2010.01)

(52) U.S. Cl.
    CPC ............ *G01S 19/41* (2013.01); *G01S 19/44* (2013.01)

(58) Field of Classification Search
    CPC ................................. G01S 19/41; G01S 19/44
    See application file for complete search history.

(56) References Cited

U.S. PATENT DOCUMENTS

| | | | |
|---|---|---|---|
| 5,610,614 | A | 3/1997 | Talbot et al. |
| 6,427,122 | B1 | 7/2002 | Lin |
| 6,453,237 | B1 | 9/2002 | Fuchs et al. |
| 6,691,066 | B1 | 2/2004 | Brodie |
| 6,856,905 | B2 | 2/2005 | Pasturel et al. |
| 6,864,836 | B1 | 3/2005 | Hatch et al. |

(Continued)

FOREIGN PATENT DOCUMENTS

| | | |
|---|---|---|
| CN | 105629263 B | 4/2019 |
| CN | 107422354 B | 6/2019 |

(Continued)

OTHER PUBLICATIONS

International Search Report and Written Opinion for PCT Application No. PCT/US20/44750 dated Jan. 8, 2021.

(Continued)

*Primary Examiner* — Dao L Phan
(74) *Attorney, Agent, or Firm* — Jeffrey Schox; Randy Mehlenbacher

(57) ABSTRACT

A method and system for determining a receiver position comprising receiving satellite observations from a set of satellites, determining differenced observations based on the satellite observations, determining an all-in-view position of the receiver based on the differenced observations, determining a set of fault modes each associated with a subset of the differenced observations, for a fault mode of the set of fault modes, determining a fault-tolerant position of the receiver using the subset of differenced observations associated with the fault mode, when the all-in-view position and the fault tolerant position of the receiver for each fault mode are within a solution separation threshold, calculating a protection level associated with the all-in-view position of the receiver.

20 Claims, 10 Drawing Sheets

(56) References Cited

U.S. PATENT DOCUMENTS

| | | |
|---|---|---|
| 7,026,982 B2 | 4/2006 | Toda et al. |
| 7,219,013 B1 | 5/2007 | Young et al. |
| 7,289,061 B2 | 10/2007 | Komjathy et al. |
| 7,292,183 B2 | 11/2007 | Bird et al. |
| 7,692,578 B2 | 4/2010 | Vollath et al. |
| 7,696,922 B2 | 4/2010 | Nicholson et al. |
| 8,094,065 B2 | 1/2012 | Henkel |
| 8,193,976 B2 | 6/2012 | Shen et al. |
| 8,542,146 B2 | 9/2013 | Vollath |
| 8,610,624 B2 | 12/2013 | Savoy |
| 8,760,343 B2 | 6/2014 | Milyutin et al. |
| 8,825,456 B2 | 9/2014 | Vasudevan et al. |
| 8,996,311 B1 | 3/2015 | Morin et al. |
| 9,069,073 B2 | 6/2015 | Ramakrishnan et al. |
| 9,128,176 B2 | 9/2015 | Seeger |
| 9,405,012 B2 | 8/2016 | Doucet et al. |
| 9,557,422 B1 | 1/2017 | Miller et al. |
| 9,602,974 B2 | 3/2017 | Rudow et al. |
| 9,612,341 B2 | 4/2017 | Large et al. |
| 9,709,683 B2 | 7/2017 | Leandro et al. |
| 9,784,844 B2 | 10/2017 | Kana et al. |
| 10,260,888 B2 | 4/2019 | Takahashi |
| 10,274,606 B1 | 4/2019 | Phan et al. |
| 10,677,933 B1 | 6/2020 | Gavrilets et al. |
| 11,422,271 B2 | 8/2022 | Talbot et al. |
| 2005/0001762 A1 | 1/2005 | Han et al. |
| 2005/0024263 A1 | 2/2005 | Sharpe et al. |
| 2005/0114023 A1 | 5/2005 | Williamson et al. |
| 2009/0018772 A1 | 1/2009 | Watanabe et al. |
| 2009/0184869 A1 | 7/2009 | Talbot et al. |
| 2009/0273511 A1 | 11/2009 | Schroth |
| 2010/0033370 A1 | 2/2010 | Lopez et al. |
| 2010/0164789 A1 | 7/2010 | Basnayake |
| 2010/0283675 A1 | 11/2010 | Mcaree et al. |
| 2011/0140959 A1 | 6/2011 | Vollath |
| 2011/0148698 A1 | 6/2011 | Vollath |
| 2011/0187589 A1 | 8/2011 | Gaal et al. |
| 2011/0187590 A1 | 8/2011 | Leandro |
| 2012/0154210 A1 | 6/2012 | Landau et al. |
| 2012/0176271 A1 | 7/2012 | Dai et al. |
| 2013/0050020 A1 | 2/2013 | Peck et al. |
| 2013/0227377 A1 | 8/2013 | Rao et al. |
| 2013/0271318 A1 | 10/2013 | Landau et al. |
| 2014/0015712 A1 | 1/2014 | Leandro et al. |
| 2014/0062765 A1 | 3/2014 | Brenner |
| 2014/0184442 A1 | 7/2014 | Large et al. |
| 2014/0232592 A1 | 8/2014 | Psiaki et al. |
| 2014/0240172 A1 | 8/2014 | Milyutin et al. |
| 2015/0019464 A1 | 1/2015 | Nguyen-Tuong et al. |
| 2015/0260848 A1 | 9/2015 | Mundt et al. |
| 2015/0293230 A1 | 10/2015 | Weed et al. |
| 2015/0293233 A1 | 10/2015 | De Jong |
| 2016/0097859 A1 | 4/2016 | Hansen et al. |
| 2016/0195617 A1 | 7/2016 | Phatak et al. |
| 2017/0269222 A1 | 9/2017 | Dai et al. |
| 2017/0299730 A1 | 10/2017 | Lie et al. |
| 2017/0322313 A1 | 11/2017 | Revol et al. |
| 2018/0113219 A1 | 4/2018 | Wuebbena |
| 2018/0120445 A1 | 5/2018 | Dill |
| 2018/0172838 A1 | 6/2018 | Junker et al. |
| 2019/0004180 A1 | 1/2019 | Jokinen |
| 2019/0154837 A1 | 5/2019 | Noble et al. |
| 2019/0187295 A1 | 6/2019 | Lee et al. |
| 2019/0187298 A1 | 6/2019 | Grgich et al. |
| 2019/0204450 A1 | 7/2019 | Revol |
| 2019/0339396 A1 | 11/2019 | Turunen |
| 2020/0096649 A1 | 3/2020 | Brandl et al. |
| 2020/0209406 A1 | 7/2020 | Lin et al. |
| 2020/0233056 A1 | 7/2020 | Dolgov et al. |
| 2020/0257002 A1 | 8/2020 | Henkel |

FOREIGN PATENT DOCUMENTS

| | | |
|---|---|---|
| CN | 114174850 A | 3/2022 |
| EP | 0244091 A2 | 11/1987 |
| EP | 1729145 A1 | 12/2006 |
| EP | 1839070 B2 | 4/2014 |
| EP | 2966477 A1 | 1/2016 |
| EP | 3627188 A1 | 3/2020 |
| EP | 3566021 B1 | 3/2021 |
| WO | 2017070732 A1 | 5/2017 |

OTHER PUBLICATIONS

International Search Report and Written Opinion for PCT Application No. PCT/US20/31137 dated Sep. 4, 2020.

"An Introduction to GNSS, Chapter 4, GNSS Error Sources", https://novatel.com/an-introduction-to-gnss/chapter-4-gnsserror-sources, published 2015.

"Phase II of the GNSS Evolutionary Architecture Study", https://www.faa.gov/about/office_org/headquarters_offices/ato/service_units/techops/navservices/gnss/library/documents/media/geasphaseii_final.pdf, Feb. 2010.

Altmayer, Christian , "Cycle Slip Detection and Correction by Means of Integrated Systems", ION Institute of Navigation, Proceedings of the 200 National Technical Meeting of the Institute of Navigation, Abstract, Jan. 26-28, 2000.

Blanch, Juan , et al., "RAIM with Optimal Integrity and Continuity Allocations Under Multiple Failures", IEEE Transactions on Aerospace and Electronic Systems, vol. 46, No. 3, Jul. 2010.

Brack, A., "Optimal Estimation of a Subset of Integers With Application to GNSS", Artificial Satellites, vol. 51, No. 4—2016 DOI: 10.1515/arsa-2016-0011.

Brocard, Philippe , "Integrity monitoring for mobile users in urban environment", https://tel.archives-ouvertes.fr/tel-01379632/document, submitted Oct. 11, 2016.

Cassel, Ryan , "Real-Time ARAIM Using GPS, GLONASS, and GALILEO", Submitted in partial fulfillment of the requirements for the degree of Master of Science in Mechanical and Aerospace Engineering in the Graduate College of the Illinois Institute of Technology, May 2017.

Chiu, David S., et al., "Bierman-Thorton UD Filtering for Double-Differenced Carrier Phase Estimation Accounting for Full Mathematical Correlation", Jan. 2008, ION NTM 2008, pp. 756-762., Jun. 23, 2017 00:00:00.0.

Feng, Shaun , et al., "Carrier phase-based integrity monitoring for high-accuracy positioning", GPS Solution, Apr. 2009.

Gratton, Livio , et al., "Carrier Phase Relative RAIM Algorithms and Protection Level Derivation", Journal of Navigation (2010), 63, 215-231, doi: 10.1017/S0373463309990403.

Gunning, Kazuma , et al., "Design and evaluation of integrity algorithms for PPP in kinematic applications", Proceedings of the 31st International Technical Meeting of the Satellite Division of The Institute of Navigation (ION GNSS+ 2018) Sep. 24-28, 2018, Hyatt Regency Miami, Miami, Florida.

Henkel, Patrick, et al., "Joint L-/C-Band Code and Carrier Phase Linear Combinations for Galileo", International Journal of Navigation and Observation, vol. 2008, Article ID 651437, 8 pages.

Huang, Panpan , "Airborne GNSS PPP Based Pseudolite System", School of Civil and Environmental Engineering Faculty of Engineering UNSW. Jun. 2019.

Karaim, Malek , et al., "GNSS Error Sources", https://www.intechopen.com/books/multifunctional-operation-and-application-of-gps/gnss-error-sources, published Apr. 6, 2018.

Khanafseh, Samer , et al., "GNSS Multipath Error Modeling for Automotive Applications", Abstract only, Proceedings of the 31st International Technical Meeting of the Satellite Division of The Institute of Navigation (ION GNSS+2018), Miami, Florida, Sep. 2018, pp. 1573-1589, https://www.ion.org/publications/abstract.cfm? articleID=16107.

Kuusniemi, Heidi, et al., "GNSS Signal Reliability Testing in Urban and Indoor Environments", Proceedings of NTM 2004 Conference (Session A2), San Diego, CA, Jan. 26-28, 2004, The Institute of Navigation.

Lee, Jae Ho , et al., "A Two-antenna GPS Receiver Integrated with Dead Reckoning Sensors", ION Institute of Navigation, Proceedings of the IAIN Work Congress and the 56th Annual Meeting of the Institute of Navigation, Jun. 26-28, 2000, 4 pages.

(56) References Cited

OTHER PUBLICATIONS

Li, T., et al., "Some remarks on GNSS integer ambiguity validation methods", Survey Review, Dec. 5, 2012, vol. 44, No. 326.

Lin, Ming, et al., "Robust Gaussian Process Regression for Real-Time High Precision GPS Signal Enhancement", www.gps.gov/systems/gps/performance/accuracy, Jun. 5, 2019.

Liu, Haiying, et al., "A closed-loop EKF and multi-failure diagnosis approach for cooperative GNSS positioning", Engineering, GPS Solutions, Published 2015.

Madrid, Navarro, et al., "New Approach for Integrity Bounds Computation Applied to Advanced Precise Positioning Applications", Proceedings of the 28th International Technical Meeting of the Satellite Division of The Institute of Navigation (ION GNSS+ 2015) Sep. 14-18, 2015, Tampa Convention Center, Tampa, Florida.

Pervan, Boris, et al., "Shaping Aviation Integrity Two RAIMs for Safety", GPS World The Business and Technology of Global Navigation and Positioning, Apr. 1, 2008.

Phelts, R. Eric, et al., "Innovation: Improving ARAIM, An approach using precise point positioning", GPS World, Jun. 13, 2020, https://www.gpsworld.com/innovation-improving-araim/.

Pullen, Sam, "Augmented GNSS: Fundamentals and Keys to Integrity and Continuity", Department of Aeronautics and Astronautics, Stanford University, Stanford, CA 94305-4035 USA, Tuesday, Sep. 20, 2011 1:30-5:00 PM Oregon Convention Center, Portland, Oregon.

Rasmussen, C.E., et al., "Gaussian Processes for Machine Learning", MIT Press, 2006, ISBN 026218253X. c 2006 Massachusetts Institute of Technology, (Year: 2006).

Satirapod, Chalermchon, "Improving the GPS Data Processing Algorithm for Precise Static Relative Positioning", School of Surveying and Spatial Information Systems The University of New South Wales Jan. 2002.

Subirana, J. Sanz, et al., "Carrier Phase Cycle-Slip Detection—Navipedia", https://gssc.esa.int/navipedia/index.php/Carrier_Phase_Cycle-Slip_Detection, published 2011.

Takasu, Tomoji, et al., "ION GNSS 2008 abstract submission Cycle slip detection and fixing by MEMS IMU/GPS Integration for mobile environment RTK-GPS", Tokyo University of Marine Science and Technology, ION GNSS 2008, abstract submission.

Teunissen, P.J.G., "GNSS Integer Ambiguity Validation: Overview of Theory and Methods", Proceedings of the ION 2013 Pacific PNT Meeting, Apr. 23-25, 2013, Marriott Waikiki Beach Resort & Spa, Honolulu, Hawaii, https://www.on.org/publications/abstract.cfm?articleID=11030.

Teunissen, Peter J.G., et al., "Integer Aperture Estimation A Framework for GNSS Ambiguity Acceptance Testing", InsideGNSS, Mar./Apr. 2011, pp. 66-73, www.insidegnss.com.

Teunissen, P.J.G., "On the GPS widelane and its decorrelating property", Delft Geodetic Computing Centre, Journal of Geodesy (1997) 71: 577-587.

Thombre, Sarang, et al., "GNSS Threat Monitoring and Reporting: Past, Present, and a Proposed Future", The Journal of Navigation, Dec. 2017, DOI: 10.1017/S0373463317000911, https://www.researchgate.net/publication/321663256.

Urquhart, Landon, "An Analysis of Multi-Frequency Carrier Phase Linear Combinations for GNSS", Department of Geodesy and Geomatics Engineering, University of New Brunswick, Technical Report No. 263, Feb. 2009.

Urquhart, Landon, et al., "Innovation: Integrity for safe navigation", https://www.gpsworld.com/innovation-integrity-for-safe-navigation-provided-by-gnss-service/, GPS World, Feb. 12, 2020.

Van Graas, Frank, et al., "Precise Velocity Estimation Using a Stand-Alone GPS Receiver", Abstract only, Journal of The Institute of Navigation, vol. 51, No. 4, Winter 2004-2005, pp. 283-292, https://www.ion.org/publications/abstract.cfm?articleID=102384.

Verhagen, S., "The GNSS integer ambiguities: Estimation and validation", Aerospace Engineering, Jan. 31, 2005.

Waserman, Eyal, et al., "A Mixed Integer Least-Squares Formulation of the GNSS Snapshot Positioning Problem", https://github.com/eyalw711/snapshot-positioning, Jun. 2, 2021.

Yang, Wenhao, et al., "An Improved Relative GNSS Tracking Method Utilizing Single Frequency Receivers", Sensors 2020, 20, 4073; doi:10.3390/s20154073 www.mdpi.com/journal/sensors, 19 pages.

Zhu, Ni, et al., "GNSS Position Integrity in Urban Environments: A Review of Literature", IEEE Transactions on Intelligent Transportation Systems, 2018, 17p., 10.1109/TITS.2017.2766768.hal-01709519.

"Integrity-Navipedia", https://gssc.esa.int/navipedia/index.php/Integrity, published 2011.

"Safe Position Augmentation for Real-Time Navigation (SPARTN) Interface Control Document Version 1.8.0", Jan. 2020, Sapcorda Services GmbH.

"RAIM", GMV, 2011, RAIM.

SYSTEM AND METHOD FOR SATELLITE POSITIONING

CROSS-REFERENCE TO RELATED APPLICATIONS

This application claims the benefit of U.S. Provisional Application No. 63/036,748, filed 9 Jun. 2020, which is incorporated in its entirety by this reference.

TECHNICAL FIELD

This invention relates generally to the satellite positioning field, and more specifically to a new and useful system and method in the satellite positioning field.

BACKGROUND

Traditional receiver autonomous integrity monitoring algorithms (RAIM such as advanced RAIM (ARAIM), extended RAIM (ERAIM), relative RAIM (RRAIM), etc.) are designed to estimate an integrity of a receiver position determined using satellite observations. However, these techniques typically estimate the integrity using satellite pseudorange, limiting the position accuracy of the solution and providing large protection levels such as on the order of meters to tens of meters. Emerging problems in receiver positioning can benefit from improved accuracies. Thus, there is a need in the satellite positioning field to create a new and useful system and method. This invention provides such new and useful systems and methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 2:
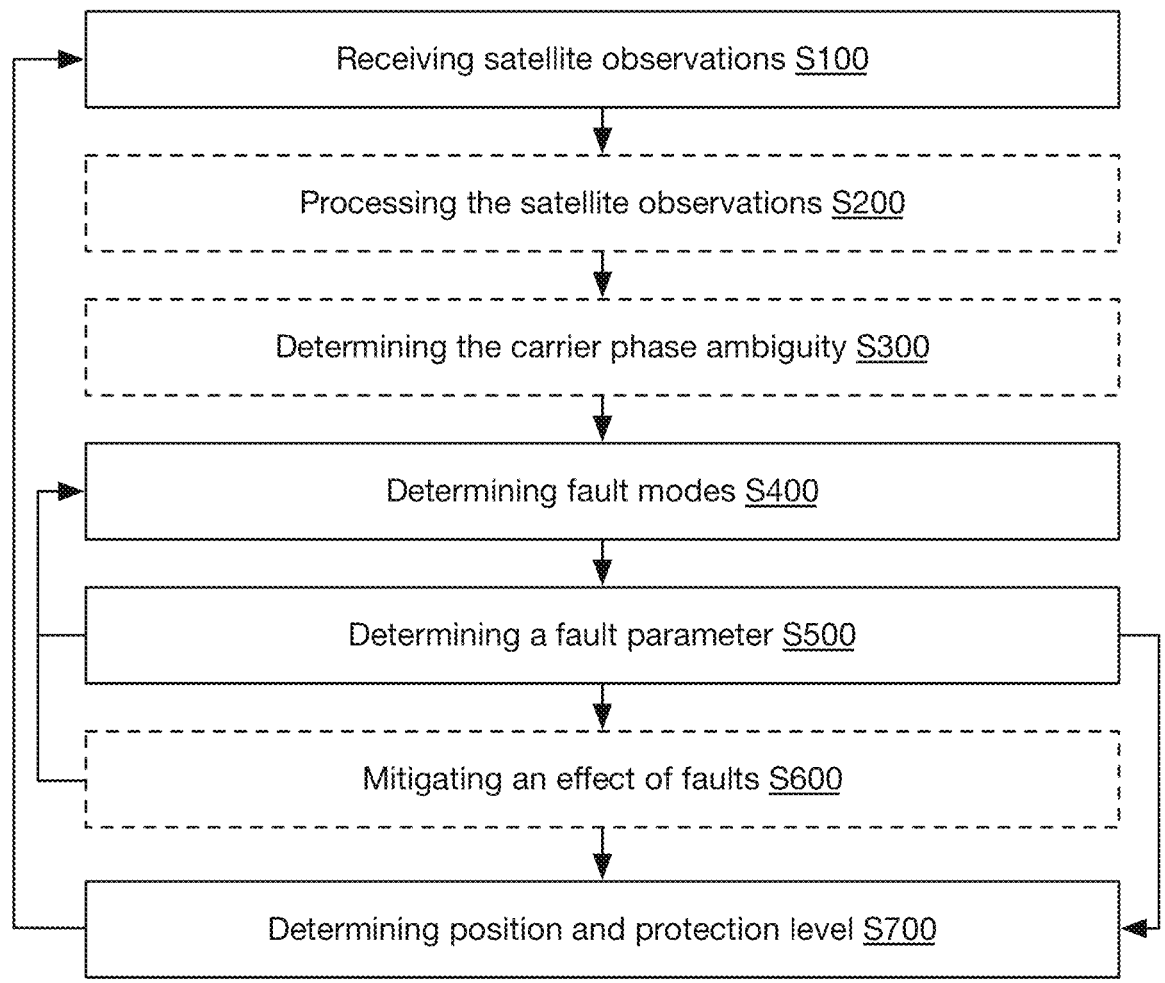
FIG. 2 is a schematic representation of the method.

As shown in FIG. 2, the method can include receiving satellite observations S100, determining fault modes for the satellite observations S400, determining a fault parameter S500, and determining position and protection levels S700. The method can optionally include processing the satellite observations S200, determining the carrier phase ambiguity for the satellite observations S300, mitigating an effect of a fault S600, and/or any suitable steps.

Figure 1:
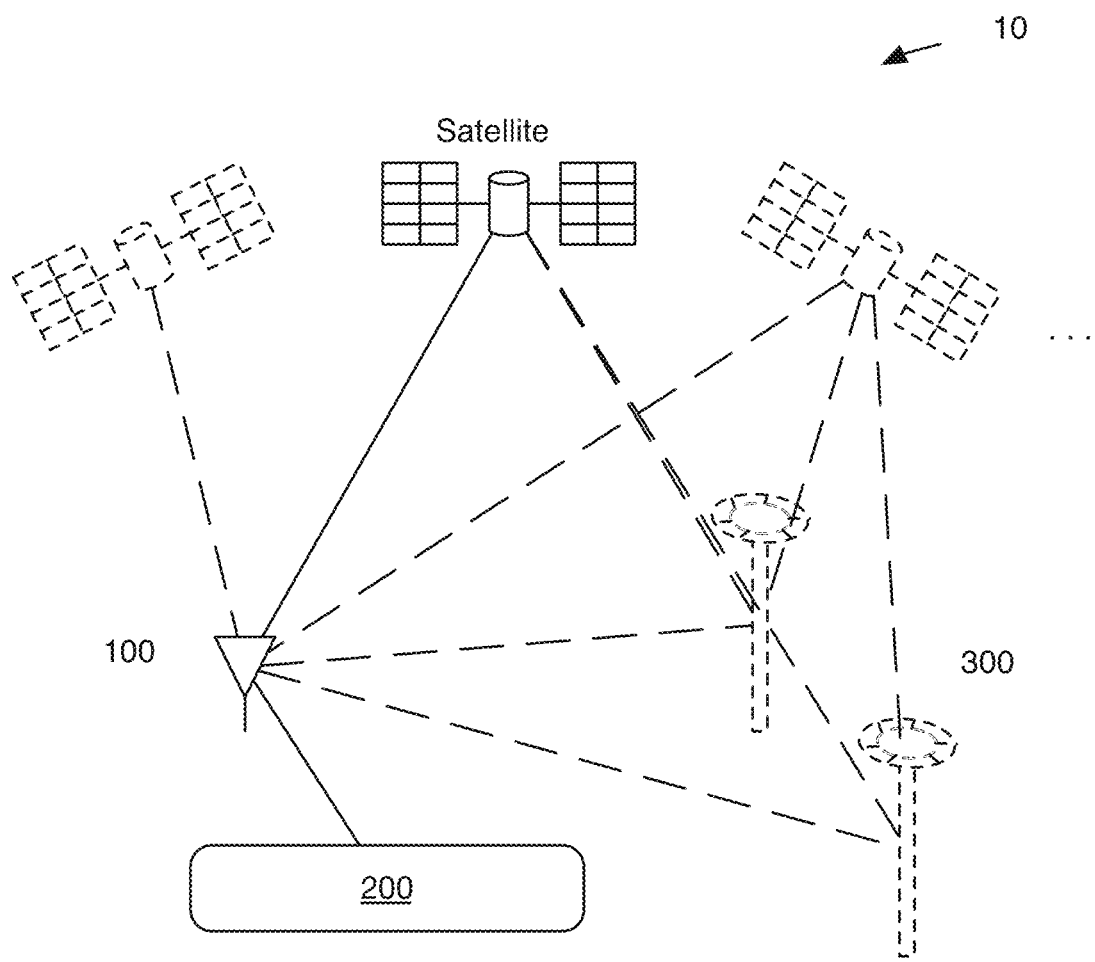
FIG. 1 is a schematic representation of the system.

As shown in FIG. 1, the system 10 can include a GNSS receiver 100 and a computing system 200. The system can optionally include one or more reference station 300. The GNSS receiver and the reference station are preferably coupled to a set of satellites (e.g., configured to receive signals from each satellite of the set of satellites). The set of satellites can correspond to one or more satellite constellation (e.g., GPS, BDS, Galileo, GLONASS, etc.).

The system and method preferably function to estimate a position and associated protection levels of a GNSS receiver. Embodiments of the system and/or method can be used, for example, in autonomous or semi-autonomous vehicle guidance (e.g., for unmanned aerial vehicles (UAVs), unmanned aerial systems (UAS), self-driving cars, agricultural equipment, robotics, rail transport/transit systems, autonomous trucking, last mile delivery, etc.), GPS/GNSS research, surveying systems, user devices, mobile applications, internet-of-things (IOT) devices, and/or may be used in any other suitable application. In specific examples, the system (and/or components) can be coupled to any suitable external system such as a vehicle (e.g., UAV, UAS, car, truck, etc.), robot, railcar, user device (e.g., cell phone), and/or any suitable system, and can provide positioning data, integrity data (e.g., protection level data), and/or other data to said system.

2. Benefits.

Variations of the technology can confer several benefits and/or advantages.

First, variants of the technology can estimate protection levels and/or receive position using only carrier phase (e.g., differenced carrier phase), which can enable the technology to better integrate with existing real-time kinematics (RTK) GNSS solutions. By using carrier phase, these variants can enable higher accuracy position determination and/or tighter tolerances for the protection levels. In a specific example, using carrier phase can be enabled by transforming the satellite observations (e.g., to differenced satellite observations) and/or by considering fault modes that account for differenced satellite observations.

Differenced satellite observations are generally incompatible with conventional RAIM methods because the observations are now correlated via the reference satellite used for differencing, while RAIM (e.g., ARAIM) assumes uncorrelated observations. The inventors have discovered that, when analyzing the (differencing) reference satellite as the fault mode, a different reference satellite can be used without substantial loss of accuracy and/or precision, such that fault mode detection can be used with correlated observations. In particular, the inventors have found that no matter which reference satellite is chosen for a given fault mode, a legitimate protection level (e.g., a protection level such that the probability of an error in the position estimate exceeding the protection level is guaranteed to be less than a given threshold) will result. Relatedly, the inventors have found that any reference satellite (e.g., for each fault mode) can be selected from the set of non-faulting satellites and the resulting protection level will be legitimate. The inventors have also modified the fault-tolerant position calculations and the solution separation test to accommodate for the differenced observations.

Second, variants of the technology can enable more accurate (e.g., conservative, tighter, more representative, etc., in one or more coordinates) bounds on the protection level to be achieved (e.g., as compared to traditional RAIM technology). More accurate bounds on the protection level can be beneficial for ensuring or providing more accurate knowledge of the probable receiver position. In a specific example, the more accurate bounds can be achieved by accounting for the covariances and/or correlations between satellite observations and/or receiver positions in the solution separation threshold.

Third, variants of the technology can determine an accurate (e.g., accurate to within 0.01%, 0.1%, 1%, 2%, 5%, 10%, 20%, 25%, 50%, etc. of the actual) upper bound on the error of (e.g., a protection level of) a receiver position estimate (e.g., a high accuracy receiver position estimate). These variants preferably achieve said protection level using a low CPU load. In specific examples, accurate protection levels can be achieved by correcting for correlations or covariances in satellite observations, storing intermediate data between receiver position estimates, and/or by generating optimal (e.g., including the maximal number of fault tolerant satellite observations) fault modes.

However, variants of the technology can confer any other suitable benefits and/or advantages.

3. System.

The system 10 preferably functions to determine the position and associated integrity of a receiver.

The system 10 preferably uses a set of data collected by one or more data sources. Data sources can include: receivers (e.g., GNSS receivers, antennae, etc.), sensors (e.g., located onboard the receiver, the external system, the reference stations, etc.), databases, satellites, reference stations, and/or any other suitable data source. Examples of data that can be used include: satellite observations, sensor observations, and/or any other suitable data.

The receiver 100 (e.g., GNSS receiver, mobile receiver, antenna, etc.) preferably functions to receive a set of satellite observations (e.g., satellite signals such as carrier phase and satellite code) from one or more satellites. In variants, the receiver (e.g., a processor of a receiver) can determine the location of the receiver (and/or external system) based on the satellite observations. The receiver is preferably in communication with the computing system. However, the receiver can be integrated with the computing system, and/or the receiver and computing system can be arranged in any suitable manner. The receiver is preferably a stand-alone device (e.g., a GNSS receiver, antenna). However, the receiver can be integrated into the external system (e.g., be a component of an automobile, aero vehicle, nautical vehicle, mobile device, etc.), can be a user device (e.g., smart phone, laptop, cell phone, smart watch, etc.), and/or can be configured in any suitable manner.

The set of satellite observations can include orbital data, timestamp, code data, carrier phase data, pseudocode data, and/or any suitable data. The set of satellite observations can be associated with metadata (e.g., ephemeris), and/or any suitable data. The set of satellite observations preferably includes satellite observations corresponding to satellites from a plurality of satellite constellations (e.g., Global Positioning System (GPS), GLObal Navigation Satellite System (GLONASS), BeiDou navigation satellite System (BDS), Galileo, etc.). However, the set of satellite observations can correspond to satellites from a single satellite constellation, can include data from an augmentation system (e.g., Satellite Based Augmentation System (SBAS) such as Wide Area Augmentation System (WAAS), European Geostationary Navigation Overlay Service (EGNOS), Multi-Functional Satellite Augmentation System (MSAS), Omnistar, StarFire, etc.; Ground Based Augmentation Systems (GBAS) such as Local Area Augmentation System (LAAS); etc.), and/or can include any suitable data. Each satellite observation from the set of satellite observations preferably corresponds to a common time window (e.g., epoch). However, each satellite observation can be associated with a time stamp (e.g., time of transmission, time of receipt, time of processing, etc.), different time windows (e.g., different epochs), and/or the satellite observations can have any suitable timing.

In variants of the system including more than one receiver, each receiver can be configured to receive satellite observations corresponding to a satellite constellation, to a carrier frequency (e.g., the L1, L2, L5, E1, E5a, E5b, E5ab, E6, G1, G2, G3, B1, B2, B3, LEX, etc. frequencies), and/or corresponding to any suitable source.

The receiver can be in communication with a correction service (e.g., a networked correction service, PPP correction service, PPP-RTK correction service, etc.), which can provide corrections (e.g., for global corrections such as clock, orbit, etc.; for local corrections such as ionosphere delay, troposphere delay, etc.; etc. such as those as disclosed in U.S. patent application Ser. No. 16/589,932 filed 1 Oct. 2019 entitled "SYSTEMS AND METHODS FOR DISTRIBUTED DENSE NETWORK PROCESSING OF SATELLITE POSITIONING DATA" and/or U.S. patent application Ser. No. 16/983,706 filed 3 Aug. 2020 entitled "SYSTEM AND METHOD FOR GAUSSIAN PROCESS ENHANCED GNSS CORRECTIONS GENERATION," each of which is incorporated in its entirety by this reference) for one or more of the satellite observations.

In variants of the system including reference stations 300 (e.g., reference receivers), the reference station(s) preferably function to receive a set of satellite observations (e.g., reference station satellite observations, reference observations, etc.) and transmit the reference station satellite observations (e.g., to the computing system, to the receiver). The satellite observations from the reference station(s) can be used to determine corrections (e.g., local and/or global corrections such as to account for atmospheric effects, to account for clock errors, etc.) to the set of satellite observations corresponding to the receiver, can be used to transform the satellite observations (e.g., computing differenced satellite observations), and/or can otherwise be used. Each reference station is preferably communicably coupled to the computing system. However, the reference station can include the computing system and/or be coupled to the computing system in any suitable manner. The reference stations can be in direct or indirect (e.g., via an intermediary) communication with the receiver. The reference station(s) are preferably located within about 500 km of the receivers, but the distance between the reference stations and the receiver can be any suitable distance.

The reference station satellite observations preferably correspond to the same set of satellites as the set of satellite observations. However, the reference station satellite observations can correspond to any suitable satellite observations.

The location (e.g., position) of the reference station(s) is preferably known to a high degree of accuracy (e.g., less than 1 mm, 1 cm, 1 dm, 1 m, etc. of uncertainty in the location of the reference station such as in the location of the reference station antenna). The location of the reference station(s) can be static and/or dynamic.

The computing system 200 preferably functions to process the data (e.g., satellite observations) from the receiver and/or the reference stations. The computing system can: aggregate the data (e.g., combine the receiver satellite observations, reference station satellite observations, and sensor data; reorganize the receiver satellite observations, reference station satellite observations, and sensor data such as based on the time stamp, time of transmission, time of receipt, etc.; etc.), filter the data (e.g., to calculate state vectors, ambiguities such as phase ambiguities, etc. associated with the data), calculate the receiver position (e.g., based on the ambiguities), calculate the protection level, determine the fault modes, determine a fault parameter, correct the data (e.g., correct the satellite observations for clock errors, hardware bias, atmospheric effects, etc.), and/or can process the data in any suitable manner. The computing system can be local (e.g., on-board the external system, integrated in a receiver, integrated with a reference station, etc.), remote (e.g., cloud computing, server, networked, etc.), and/or distributed (e.g., between a remote and local computing system).

The computing system 200 is preferably configured to perform a RAIM calculation (e.g., RAIM, ARAIM, ERAIM, RRAIM, modified RAIM, modified ARAIM, modified ERAIM, modified RRAIM, CRAIM, PRAIM, HRAIM, VRAIM, etc.) to estimate the receiver position and protection level, but can estimate the receiver position and protection level using any algorithm. The inputs to the RAIM calculation are preferably the carrier phase (e.g., carrier phase with ambiguities resolved) and/or the satellite code data, but can additionally or alternatively include pseudorange, ambiguities and/or any suitable data. In a specific example, the inputs to the RAIM calculation are only the carrier phases associated with satellites of the set of satellites. In a variation of this specific example, the inputs to the RAIM calculation can be only carrier phases that have fixed and/or validated integer ambiguities. In a second variation of this specific example, only differenced satellite observations (for instance only double differenced observations such as to obtain a protection level associated with an RTK baseline positioning solution) can be used as inputs to the RAIM calculation. In a third variation, only differenced satellite observations that have fixed and/or validated integer ambiguities can be used as inputs to the RAIM calculation. However, any suitable inputs to the RAIM calculation can be used. Outputs from the RAIM calculation can include a receiver position, a receiver position integrity (e.g., integrity risk, protection level, etc.), fault information (e.g., fault identification, fault mitigation, fault detection, fault impact, etc.), and/or any suitable information.

The computing system is preferably communicably coupled to the receiver, to the reference station, and to the sensors, but the computing system can be in communication with any suitable components. In variants, the computing system can include one or more: processing module, dead reckoning module, and validation module. However, the computing system can include any suitable modules.

In specific examples, the system can include one or more components as described in U.S. application Ser. No. 16/817,196 filed 12 Mar. 2020, and/or U.S. application Ser. No. 16/865,077 filed 1 May 2020, each of which is incorporated herein its entirety by this reference, or otherwise configured.

4. Method.

The method preferably functions to estimate (e.g., calculate, determine) the position of the receiver and the associated integrity (e.g., protection level). Steps and/or substeps of the method can be performed iteratively (e.g., for different epochs, for the same epoch, etc.), sequentially, and/or in any suitable order. The steps and/or substeps of the method can be performed in series and/or in parallel. The steps and/or substeps are preferably performed by a system as described above, but can be performed by any system. The integrity is preferably a conservative integrity (e.g., overestimate of the actual protection level and/or receiver position, overestimate of the integrity risk, overestimate of the total integrity risk, etc. such as to better ensure that the external system can be operated according to target operation parameters), but can produce an exact and/or aggressive integrity (e.g., underestimate of the actual protection level). The method is preferably performed in real or near-real time (e.g., can be completed during a single satellite observation epoch, completed before additional satellite observations associated with a satellite are received, etc.), but can be performed with a delay (e.g., lagging to accommodate a delay in one or more data source), offline, and/or with any suitable timing.

The method and/or steps thereof (particularly, but not exclusively, steps S400 through S700) can be performed using and/or be referred to as a modified ARAIM algorithm. For instance, the ARAIM algorithm can be modified to process carrier phase observations (in addition to or alternative to pseudorange or code observations), modified to process differenced carrier phase observations, modified to process predetermined sets or subsets of satellite constellations, modified to account for observation and/or positional covariances (in addition to or alterative to variances), and/or otherwise be modified. However, the method and/or steps thereof can additionally or alternatively be performed using any suitable RAIM algorithm(s) and/or any suitable algorithm. The RAIM algorithm (e.g., modified ARAIM algorithm) can use a measurement rejection approach (MRA), an error characterization approach (ECA), and/or any suitable approach. The RAIM algorithm (e.g., modified ARAIM algorithm) can perform fault detection, fault exclusion, fault identification, fault mitigation, and/or any suitable steps in processing or determining a receiver position.

The method can include receiving satellite observations S100, determining fault modes for the satellite observations S400, determining a fault parameter S500, and determining position and protection levels S700. The method can optionally include processing the satellite observations S200, determining the carrier phase ambiguity for the satellite observations S300, mitigating an effect of a fault S600, and/or any suitable steps.

Receiving the satellite observations S100 functions to measure and/or detect a set of satellite signals, where each satellite signal is associated with a satellite, at a GNSS receiver (e.g., a mobile receiver) and/or reference station. Satellite observations corresponding to or associated with the same set of satellites are preferably received at the GNSS receiver and the reference station; however, the GNSS receiver and the reference station can receive satellite observations from any satellites. The satellite observations preferably refer to carrier phase and/or satellite signal code data. In a first specific example, the satellite observations can include only satellite carrier phase. In a second specific example, the satellite observations can include only satellite code data. In a third specific example, the satellite observations can include both satellite carrier phase and code data. However, the satellite observations can additionally or alternatively include satellite pseudorange, and/or any suitable data. Receiving the satellite observations can include transmitting the satellite observations to the GNSS receiver and/or to the computing system.

S100 is preferably performed before processing the satellite observations S200; however, S100 can be performed at the same time as S200. S100 is preferably performed by a receiver. However, S100 can additionally or alternatively be performed by one or more reference stations, by one or more sensors, and/or by any suitable component.

The data (e.g., satellite observations, sensor data, etc.) received in S100 is preferably measured during a time window (e.g., time period, epoch). Each of the sets of satellite observations can correspond to the same and/or to a different time window. In variants, after the time window has expired or ended, the method can include repeating S100 during a second time window. The second time window can be the same duration as the time window and/or a different duration. The second time window preferably immediately follows the time window; however, the second time window can be delayed relative to the time window by any amount. The (first and second) time windows are preferably separate and distinct (e.g., consecutive, nonconsecutive, etc.), but can alternatively overlap or otherwise be related. The second time window can additionally or alternatively be started in response to a trigger event (e.g., convergence of one or more calculation; receiver position; loss of satellite observations such as for a specific satellite, for an amount of time, etc.; etc.), at a predetermined time, and/or at any suitable time. However, the time window can be extended and/or any suitable action can occur in response to the trigger event.

Processing the satellite observations S200 preferably functions to transform the set of satellite observations, but can function to process the set of satellite observations in any manner (e.g., to denoise the observations, to mitigate an effect of outliers, etc.). Processing the satellite observations is preferably performed by a computing system (e.g., a processing module of a computing system, by a processor of the data receiver such as the mobile receiver, GNSS receiver, reference station, etc.), but can be performed by any component. Processing the satellite observations can include: removing non-carrier phase observations from the set of satellite observations, aligning the carrier phase observations and the validated ambiguities (e.g., from a previous epoch, from the current epoch, etc.), transforming the carrier phase observations to a differenced and/or disambiguated space, generating linear combinations of satellite observations, fixing the carrier phase observations (e.g., using the integer phase ambiguities, the validated integer phase ambiguities, etc.), correcting the satellite observations (e.g., based on corrections data generated by or received from a corrections service), and/or any suitable step(s). S200 can be performed before, during, and/or after S300.

The set of processed satellite observations can be correlated (e.g., form correlated sets of satellite observations such as differenced satellite observations), uncorrelated, and/or include both correlated and uncorrelated satellite observations. Variants where the processed satellite observations are correlated can be particularly beneficial for facilitating fault mode determination and fault mode counting as in these variants, the number of fault modes can correspond to a sum of binomial distributions (for instance based on the number and/or type of processing). Variants where the processed satellite observations are correlated can be beneficial for facilitating fault mode isolation. However, the variants can facilitate fault mode generation and/or determination in any manner.

Figure 8A:
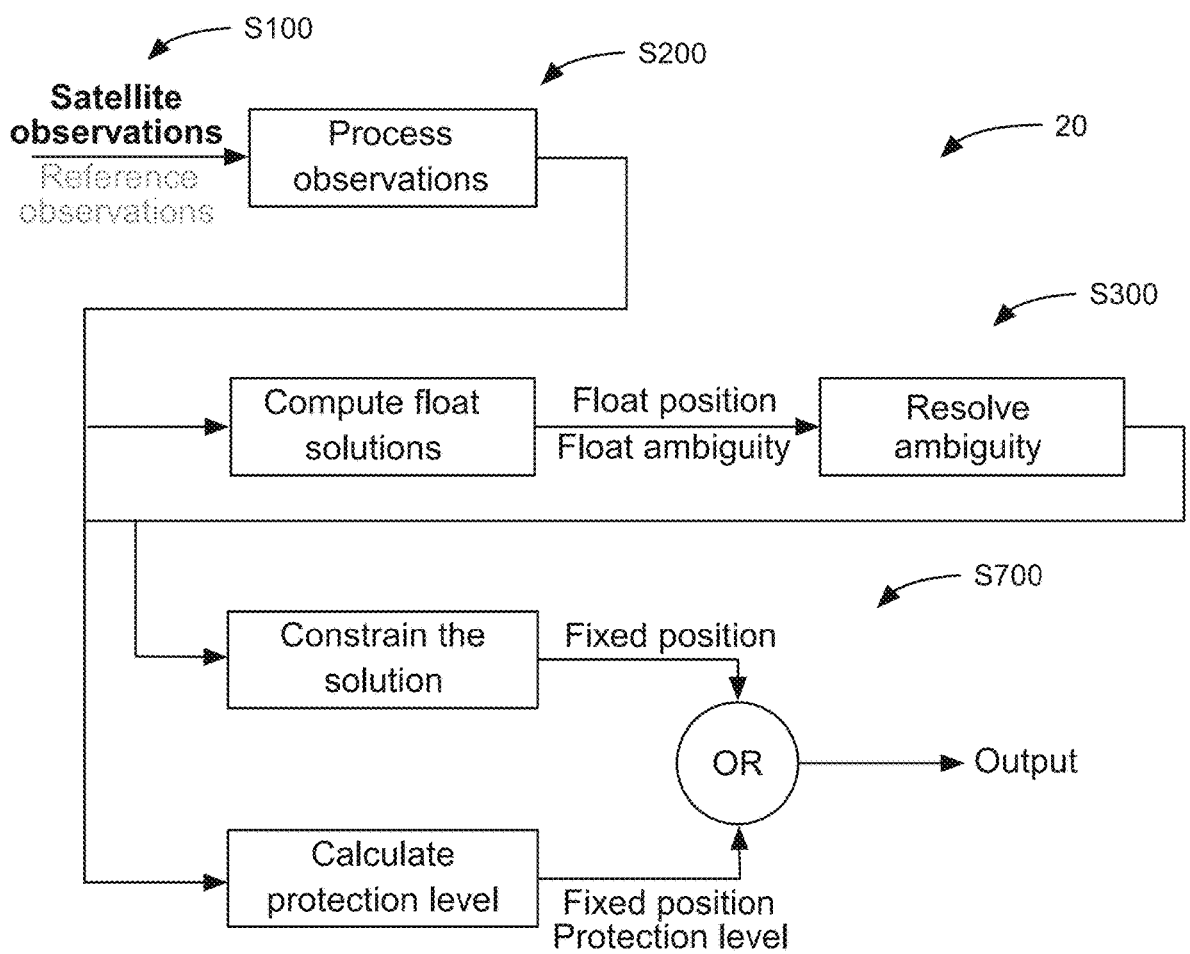
FIGS. 8A and 8B are schematic representations of exemplary receiver position and protection level determination directions.
Figure 8B:
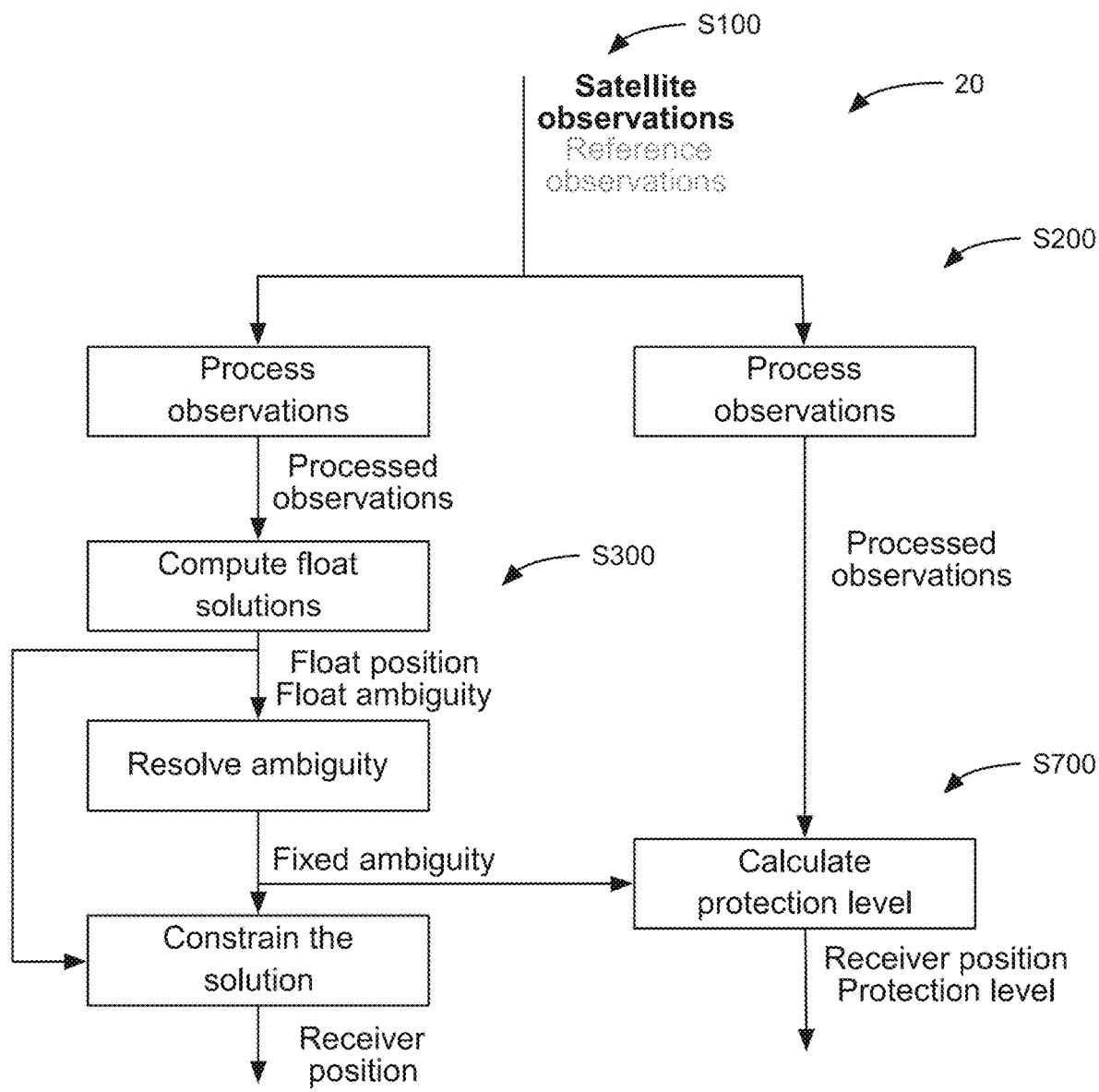

In some embodiments of the method (as shown for example in FIG. 8B), a first set of processed satellite observations can be used to determine satellite observation ambiguities and/or a receiver position and a second set of processed satellite observations can be used to determine a receiver position and/or an integrity of a receiver position. The first and second set of processed satellite observations are preferably derived from the same satellite observations. However, either the first or the second set of processed satellite observations can include information derived associated with additional or fewer satellites or other data sources. The first and the second set of processed satellite observations can be processed in the same manner or in different manners. However, a single set of processed satellite observations can be used (e.g., as shown for example in FIG. 8A), and/or any suitable number of processed satellite observations can be derived.

In specific examples (particularly of correlated satellite observations), the satellite observations can be transformed to a narrow lane, a wide lane, an extra wide lane, a Melbourne-Wübbena wide lane, a Hatch-Melbourne-Wübbena combination, a geometry free linear combination, an ionosphere-free linear combination, and/or other linear combination of satellite observations.

In specific examples, processed satellite observations can include (and/or correspond to) differenced satellite observations (e.g., differenced space). The differenced satellite observations can include a single difference (e.g., between satellite observations received at the GNSS receiver, between satellite observations received at the GNSS receiver and a satellite observations received at a reference station, etc.), double difference (e.g., between satellite observations received at the GNSS receiver and the reference station, between satellite observations received at the GNSS receiver and different reference stations), triple differenced (e.g., between satellite observations received during a first epoch at the GNSS receiver and the reference station and satellite observations received during a second epoch at the GNSS receiver and the reference station), and/or any suitable difference can be computed. A single reference satellite (e.g., per satellite constellation) is preferably used to calculate the differences (e.g., each difference is computed relative to the same satellite). In an illustrative example, double-differenced satellite observations can include GNSS receiver and reference station sources, and can be differenced within a code type against a reference satellite. However, additionally or alternatively, a single reference satellite can be used, a plurality of reference satellites can be used, and/or any data can be used to compute the difference.

In a first illustrative example such as when the satellite observations (e.g., observation space) only include carrier phase, the transformation from the measured satellite observations to the wide-lane double differenced space can be:

$$\nabla \Delta \bar{y} = T H_A^{-1} y - A$$

where $H_a$ transforms the satellite carrier phase (e.g., observation space of) y (e.g., in units of length such as meters) to a phase space $\bar{y}$ (e.g., in units of cycles), T transforms the phase space $\bar{y}$ to a double differenced phase space $\nabla \Delta \bar{y}$, and A are the carrier phase ambiguities (e.g., determined in S300, determined for a previous epoch, determined for the current epoch, etc.).

Figure 4:
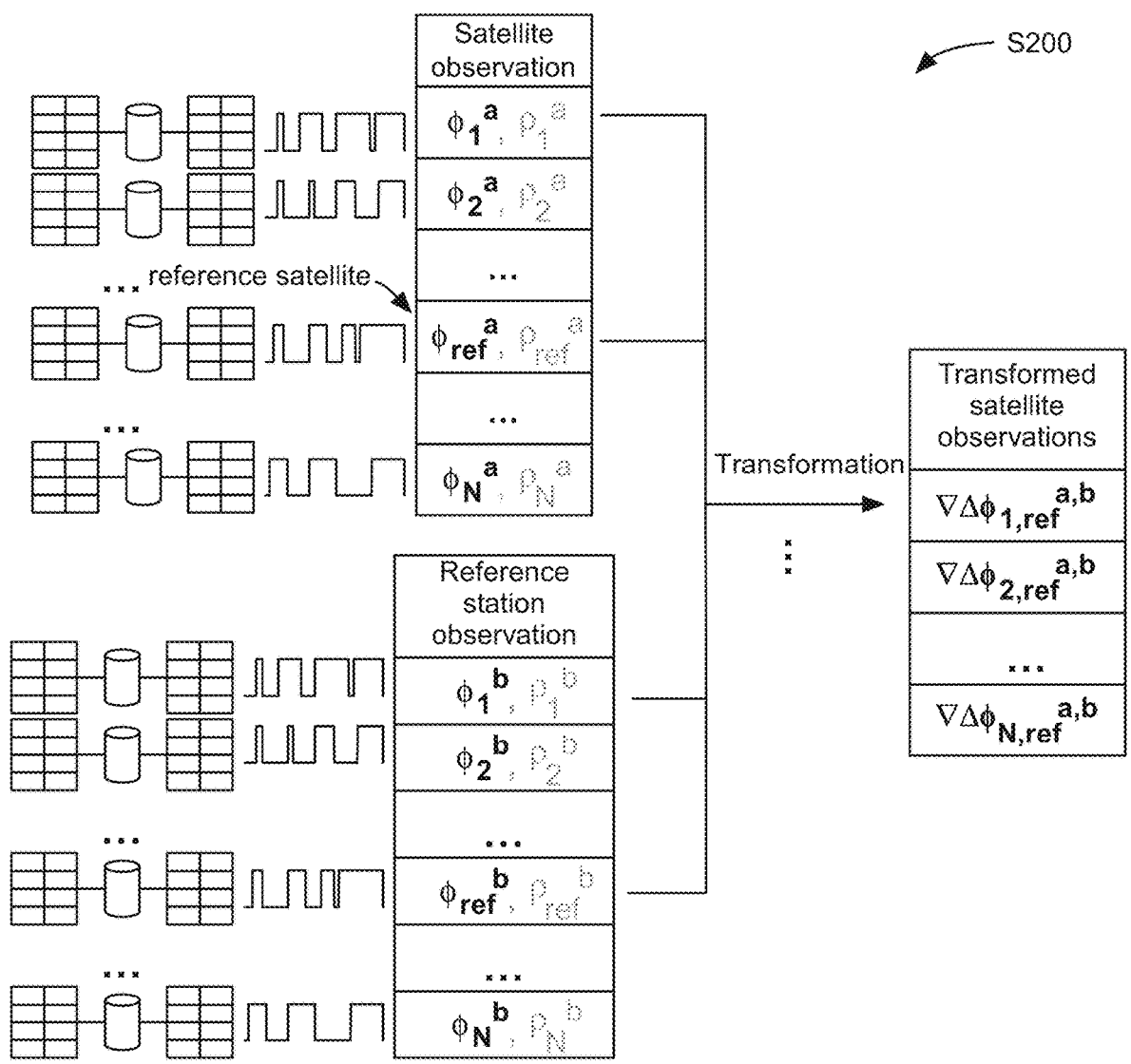
FIG. 4 is a schematic representation of an embodiment of transforming the satellite observations.

In a second illustrative example as shown in FIG. 4, the transformation from the measured satellite observations to the wide-lane double difference space can be:

$$\nabla \Delta \bar{y}' = T' H'^{-1}_A y' - A$$

Where $y' = [_\varphi^\rho]$, where $\rho$ corresponds to noncarrier phase observations (e.g., satellite code, pseudorange, etc.), $\varphi$ correspond to carrier phase observations, $$T' = \begin{bmatrix} I & 0 \\ 0 & T \end{bmatrix}$$

and $$H'_A = \begin{bmatrix} I & 0 \\ 0 & H_A \end{bmatrix}.$$

However, any transformation(s) can be used.

Determining the carrier phase ambiguities S300 functions to determine an unknown ambiguity in the carrier phase of each satellite observation. The unknown ambiguity is preferably determined to be an integer ambiguity, but can be determined as a floating (e.g., floating precision) ambiguity and/or determined in any precision. S300 can be performed before, during, and/or after S200. S300 is preferably performed by a computing system (e.g., a GNSS receiver computing system, a cloud computing system, etc.), but can be performed by any suitable component. The carrier phase ambiguities are preferably validated, but can be unvalidated. Determining and/or validating the carrier phase ambiguity can be performed as described in U.S. application Ser. No. 16/817,196 filed 12 Mar. 2020 entitled "SYSTEMS AND METHODS FOR REAL TIME KINEMATIC SATELLITE POSITIONING", U.S. patent application Ser. No. 16/685,927 filed 15 Nov. 2019 entitled "SYSTEM AND METHOD FOR SATELLITE POSITIONING", U.S. application Ser. No. 17/022,924 filed 16 Sep. 2020 entitled "SYSTEMS AND METHODS FOR HIGH-INTEGRITY SATELLITE POSITIONING", and/or U.S. application Ser. No. 17/235,333 filed 20 Apr. 2021 entitled "SYSTEM AND METHOD FOR VALIDATING GNSS AMBIGUITIES", each of which is incorporated in its entirety by this reference, and/or otherwise determined or validated.

S300 can include: determining a set of floating phase ambiguity hypotheses, determining a set of integer phase ambiguity hypotheses from the set of floating phase ambiguity hypotheses, performing hypothesis testing to validate the set of integer phase ambiguities hypotheses, and/or any suitable steps.

Determining a set of floating phase ambiguity hypotheses preferably functions to determine a phase ambiguity (typically in a floating point representation, but other representations can be used) associated with each satellite represented in the set of satellite observations. The set of floating phase ambiguity hypotheses can be determined using snapshot methods (e.g., using a snapshot least squares calculation) using a filter, and/or using any suitable method. The filter can be a Kalman filter, an extended Kalman filter, an unscented Kalman filter, a Bierman-Thornton filter, a particle filter, a snapshot least-squares filter, a Monte Carlo simulation, and/or any suitable mean-square error filter and/or sensor fusion algorithm. The inputs to the floating hypotheses determination method can include: satellite observations (e.g., receiver satellite observations, corrected satellite observations, reference station satellite observations, processed satellite observations, etc. preferably associated with a single epoch but potentially associated with a plurality of epochs), sensor data, and/or any suitable data. The output of the floating hypotheses determination method is preferably one or more floating carrier phase ambiguity hypotheses, but can include any suitable states (e.g., state vector) or information.

Determining a set of integer phase ambiguity hypotheses preferably functions to constrain (and/or otherwise determine from) the floating phase ambiguity hypotheses to a set of integer phase ambiguity hypotheses. Integer phase ambiguities can be beneficial for improving an accuracy of the determined receiver position as compared to the receiver position determined using floating ambiguities. Determining the set of integer phase ambiguity hypotheses can include reducing a correlation between ambiguities of the set of phase ambiguities (e.g., floating phase ambiguity hypotheses), performing a search (e.g., a least squares search, an absolute value search, etc.) to identify possible integer phase ambiguities to include in the set of integer phase ambiguity hypotheses, and/or include any suitable steps. For example, Least-Squares Ambiguity Decorrelation Adjustment (LAMBDA) algorithm, modified-LAMBDA (MLAMBDA) algorithm, LLL reduction algorithm, a whitening transformation, a coloring transformation, a decorrelation transformation, rounding, the Ambiguity Function Method (AFM), Fast Ambiguity Resolution Approach (FARA), Least-Squares Ambiguity Search Techniques (LSAST), integer bootstrapping, and/or any suitable decorrelation or reduction algorithm can be used to fix and/or identify integer phase ambiguities. The set of integer phase ambiguity hypotheses preferably includes integer phase ambiguities that satisfy a hypothesis criterion, but can include any suitable integer phase ambiguities. Example of hypotheses criterion include a threshold sum of least squares, a threshold sum of absolute differences, a threshold likelihood of the correct solution, and/or any suitable criterion. However, the set of integer phase ambiguity hypotheses can be generated in any manner.

Performing hypothesis testing preferably functions to determining the integer phase ambiguities from the set of integer phase ambiguity hypotheses that are most likely to be correct. The hypothesis test is preferably a Bayesian inference, but can additionally or alternatively be based on a statistical confidence, significance testing, and/or any suitable hypothesis testing. Examples of hypothesis tests can include difference test, ratio test, projector test, f-test GIA test, and/or any suitable hypothesis test. In an illustrative example, performing hypothesis testing can include determining a probability (e.g., a likelihood, a log likelihood, etc.) associated with subsets of integer phase ambiguities of the integer phase ambiguity hypotheses; computing a ratio of the probability between two subsets of integer phase ambiguities (e.g., within the same ambiguity set, across different ambiguity sets); when the ratio between a most-likely and a next most likely subset of integer phase ambiguities exceeds a threshold, storing the most-likely subset of integer phase ambiguities as the integer phase ambiguities and ceasing hypothesis testing. However, any hypothesis testing can be performed.

However, determining the carrier phase ambiguity can otherwise be performed.

Determining fault mode(s) S400 preferably functions to determine (e.g., identify, generate, list, enumerate, etc.) a set of fault modes for the satellites and/or satellite observations. Each fault mode of the set of fault modes can refer to (or be associated with) unique sets of satellite observations that could potentially fail, unique sets of satellites that could potentially fail, satellite constellation failure, each unique processed satellite observation that could potentially fail, and/or to any potential failure. As an illustrative example, if a set of satellite observations included three satellite observations, the set of fault modes could include up to 6 fault modes: 3 single satellite fault modes, 2 double satellite fault modes, and a triple satellite fault mode. Each fault mode can be associated with a set of excluded satellites (e.g., individual satellites, constellations, constellation subsets, etc.), a predicted probability of the fault occurring, and/or any suitable information. Determining the set of fault modes is preferably performed by the computing system (e.g., a fault module of the computing system, of the GNSS receiver, of the external system, of a cloud computing system, etc.), but can be performed by any component. Examples of faults can include: satellite failure, satellite constellation failure, non-line of sight measurements (e.g., multipath), clock errors, atmospheric effects, orbit errors, ephemeris errors, receiver faults, cycle slip, and/or any suitable faults (or predetermined events such as those disclosed in U.S. application Ser. No. 17/022,924 filed 16 Sep. 2020 entitled "SYSTEMS AND METHODS FOR HIGH-INTEGRITY SATELLITE POSITIONING" incorporated in its entirety by this reference).

S400 can be performed by a computing system (e.g., of an external system, of a GNSS receiver, cloud computing system, etc.) and/or by any suitable component. S400 is preferably performed after S100, but can be performed at the same time as S100.

Every fault mode that considers up to a predetermined number of simultaneous satellite failures is preferably analyzed. However, every potential fault mode, fault modes with a predetermined probability of occurring, a predetermined set of fault modes, and/or any suitable fault modes can be analyzed. The fault modes to be considered can depend on the application (e.g., a target protection level, a target position accuracy, a location of the external system, etc.), a probability of one or more satellites and/or satellite constellations failing, and/or can be otherwise determined.

In an illustrative example, the maximum number of simultaneous satellite failures to be considered can be determined using: $N_{fault\_max} = {}_{r>0}^{argmax}[P_{multiple}(r)<P_{threshold}]$, where $N_{fault\_max}$ corresponds to the maximum number of simultaneous satellite failures, $P_{threshold}$ corresponds to a threshold probability, r is an integer (e.g., number of simultaneous faults to consider such as satellites, observations, etc. such as 1, 2, 3, 4, 5, 7, 10, 15, 20, etc.), and an upper bound on $P_{multiple}(r)$ can be determined according to $$P_{multiple}(r) = \frac{\left(\sum_{k=1}^{Nsat+Nconst} P_{event,k}\right)^r}{r!},$$

where $N_{sat}$ corresponds to the number of satellites in the set of satellites, $N_{const}$ corresponds to the number of satellite constellations represented in the set of satellite observations, and $P_{event,k}$ is a predetermined and/or estimated probability of an event occurring. Often, $N_{fault\_max}$ is between about 1 and 3, inclusive. However, $N_{fault\_max}$ can be any value between 1 and the number of satellites in view of the receiver (e.g., number of satellites in the set of satellites, number of satellites associated with a satellite observation, etc.). The threshold probability can be a predetermined threshold (e.g., $10^{-2}$, $10^{-3}$, $10^{-4}$, $10^{-5}$, $10^{-6}$, $10^{-7}$, $10^{-8}$, $10^{-9}$, $10^{-10}$, $10^{-2}$-$10^{-10}$%, etc.), depend on the application, depend on a target integrity (e.g., target protection level), depend on the satellites in view (e.g., satellite constellations that are observed, depend on the number of satellites in view, etc.), and/or be otherwise determined.

Figure 5A:
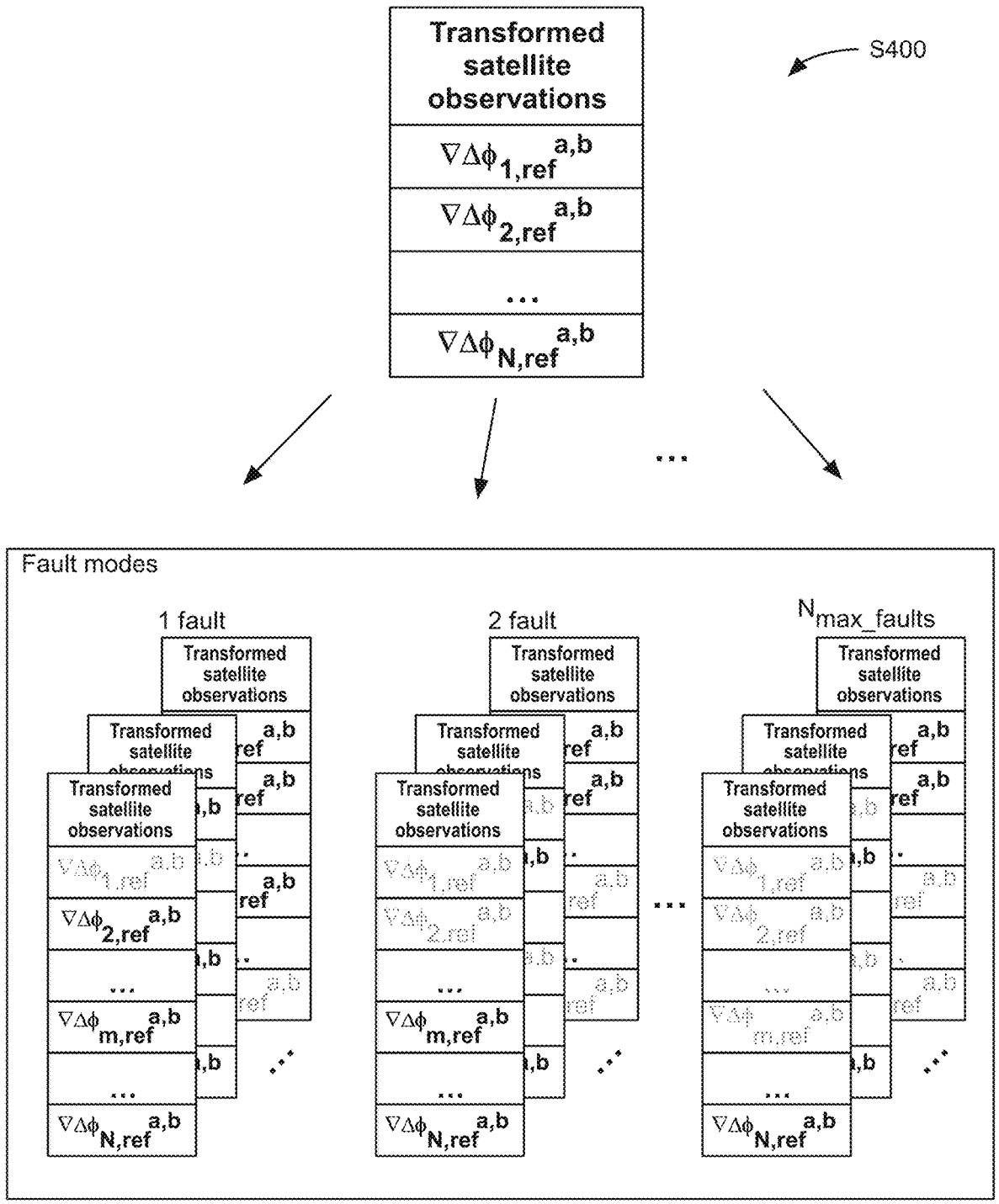
FIG. 5A is a schematic representation of an example of determining the fault modes.

In a first variant of S400, as shown in FIG. 5A, the set of fault modes can be generated or determined by iterating through every possible combination of removing satellite observations correspond to at most $N_{fault\_max}$ satellite failures to generate each unique permutation of satellite observations excluding m satellites, where m is an integer less than or equal to $N_{fault\_max}$. In examples of the first variant, the set of fault modes can exclude fault modes corresponding to faults in the reference satellite which may lead to larger (or erroneous) protection levels.

In a second variant, the set of fault modes can be generated or determined by iterating through every possible combination of removing satellite observations corresponding to at most $N_{fault\_max}$ satellite observations to generate each unique permutation of satellite observations excluding m satellite observations, where m is an integer less than or equal to $N_{fault\_max}$.

In a variation of the first and/or second variant, the satellite observations can be modified such that the fault modes do not need to consider the processed satellite observations (e.g., do not need to use or see double-differenced measurements). For example, each reference satellite can have a single-differenced ambiguity of 0, where double-differenced satellite observations can be mapped into single-differenced satellite observations by "adding" this ambiguity to each measurement. Additionally or alternatively, the set of satellite observations can be processed (e.g., rotated transformed, etc.) to a different representation or space. For instance, double differenced satellite observations can be transformed to single differenced satellite observations, to double differenced satellite observations relative to a different reference satellite, to undifferenced satellite observations, to differenced satellite observations relative to an arbitrary constant (e.g., a predetermined constant, a fixed error, an independently determined value, etc.), and/or otherwise be transformed. In this variation, a single clock state (e.g., per constellation, per satellite, per reference satellite, per process, etc.) is preferably retained, which could provide an estimate for the reference satellite ambiguity. This variation can be beneficial for decreasing and/or removing a need to consider correlations between fault modes. However, this variation can otherwise be achieved.

Figure 5B:
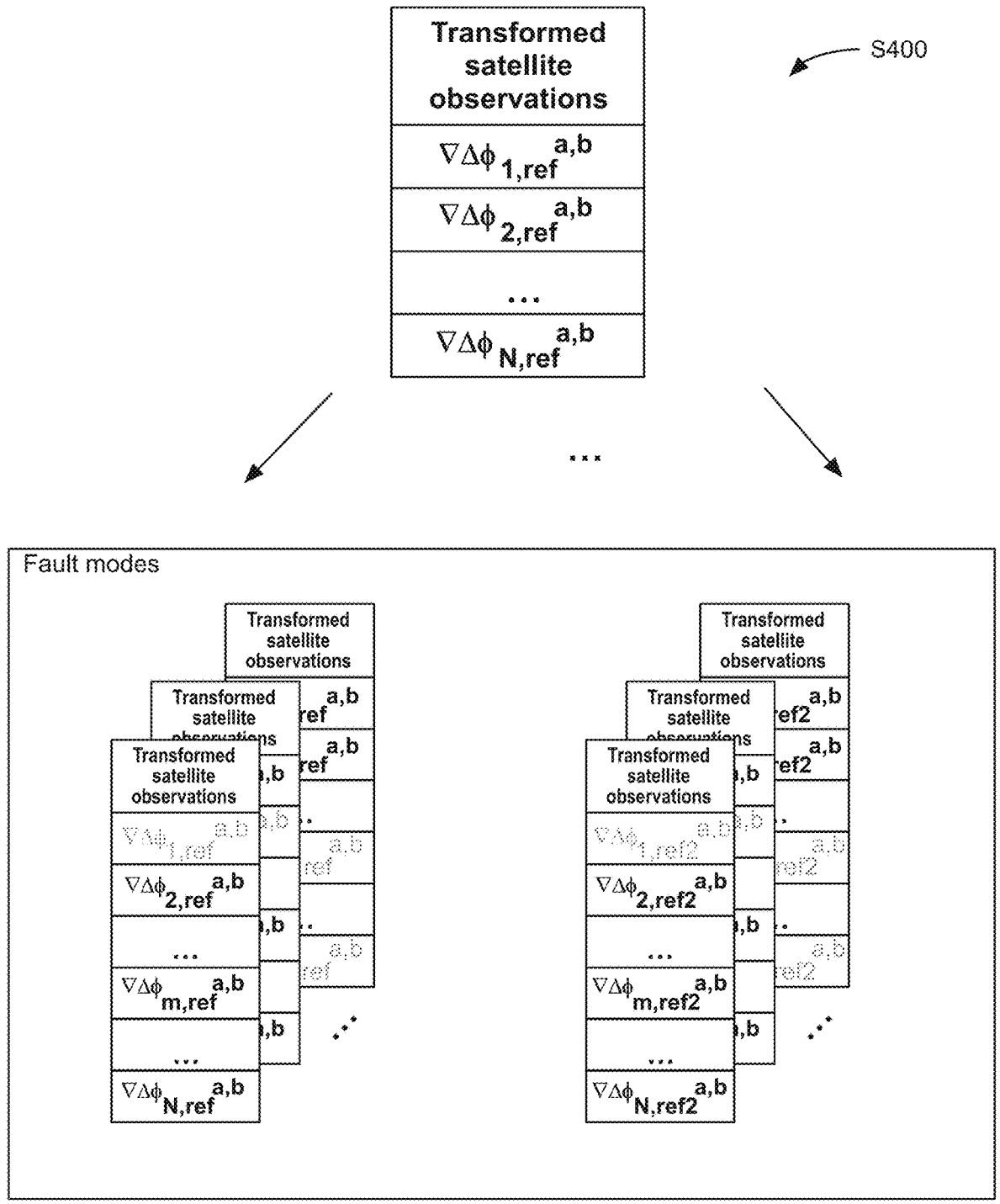
FIG. 5B is a schematic representation of an example of determining the fault modes where a subset of the fault modes correspond to transformed satellite observations using a different reference satellite from the satellite observations.

As shown for example in FIG. 5B, determining the set of fault modes can include determining a second reference satellite, where the second reference satellite is preferably distinct from the reference satellite. The second reference satellite is preferably not potentially faulty (e.g., selected from a fault mode or associated set of satellite observations that exceeds a threshold probability of not including a fault), but can be randomly or pseudorandomly selected (e.g., from the set of satellites excluding the original reference satellite), selected based on a property of the second reference satellite (e.g., line of sight to the satellite, signal strength, predicted availability, predicted duration of the satellite remaining in view of the receiver, etc.), can be potentially faulty (e.g., selected from a fault mode or associated set of satellite observations that exceeds a threshold probability of including a fault), and/or can otherwise be selected. In general, the second reference satellite is or will be tested for a potential fault (e.g., during a second instance of S400 and/or S500), but the second reference satellite does not have to be tested for a potential fault. The set of fault modes can include a subset of fault modes corresponding to satellite observations processed relative to the reference satellite and a second subset of fault modes corresponding to satellite observations processed relative to the second reference satellite (e.g., by applying a transformation as described above to change from a first differenced space to a second differenced space). The two subsets of fault modes are preferably distinct (e.g., account for different fault modes), but can be overlapping and/or otherwise related. In a specific example, the second subset of fault modes can be determined by applying a second transformation matrix to the satellite observations (e.g., the transformed satellite observations), where the second transformation matrix transforms the satellite observations to a second differenced space (e.g., a fault tolerant second space). The second transformation matrix can be determined by taking the intersection between the transformation matrix (e.g., the transformation matrix that transforms the satellite observations to the differenced space) and the matrix formed by dropping the rows corresponding to the observations assumed to be faulting from the identity matrix. This specific example can have the benefit of including the maximum number of satellite observations within the fault mode (e.g., no other set of satellite observations can be generated that is fault tolerant such as to test for potential faults in the reference and/or faulting satellite(s) and has more observations).

Determining a fault parameter S500 preferably functions to determine a fault parameter (e.g., for each fault mode) that is correlated with and/or indicative of whether any satellites are likely to have faulted and/or whether any satellites have faulted (e.g., failed). The fault parameter is preferably a probability that the fault-tolerant receiver position associated with the fault parameter exceeds the protection level (e.g., a likelihood that a fault has occurred), but can additionally or alternatively be a probability that the fault will occur or has occurred, a probability that the fault-tolerant receiver position along a reference axis or coordinate exceeds the protection level (e.g., the protection level for the same reference axis or coordinate), an identification of a fault as present, and/or any suitable fault parameter.

Figure 3:
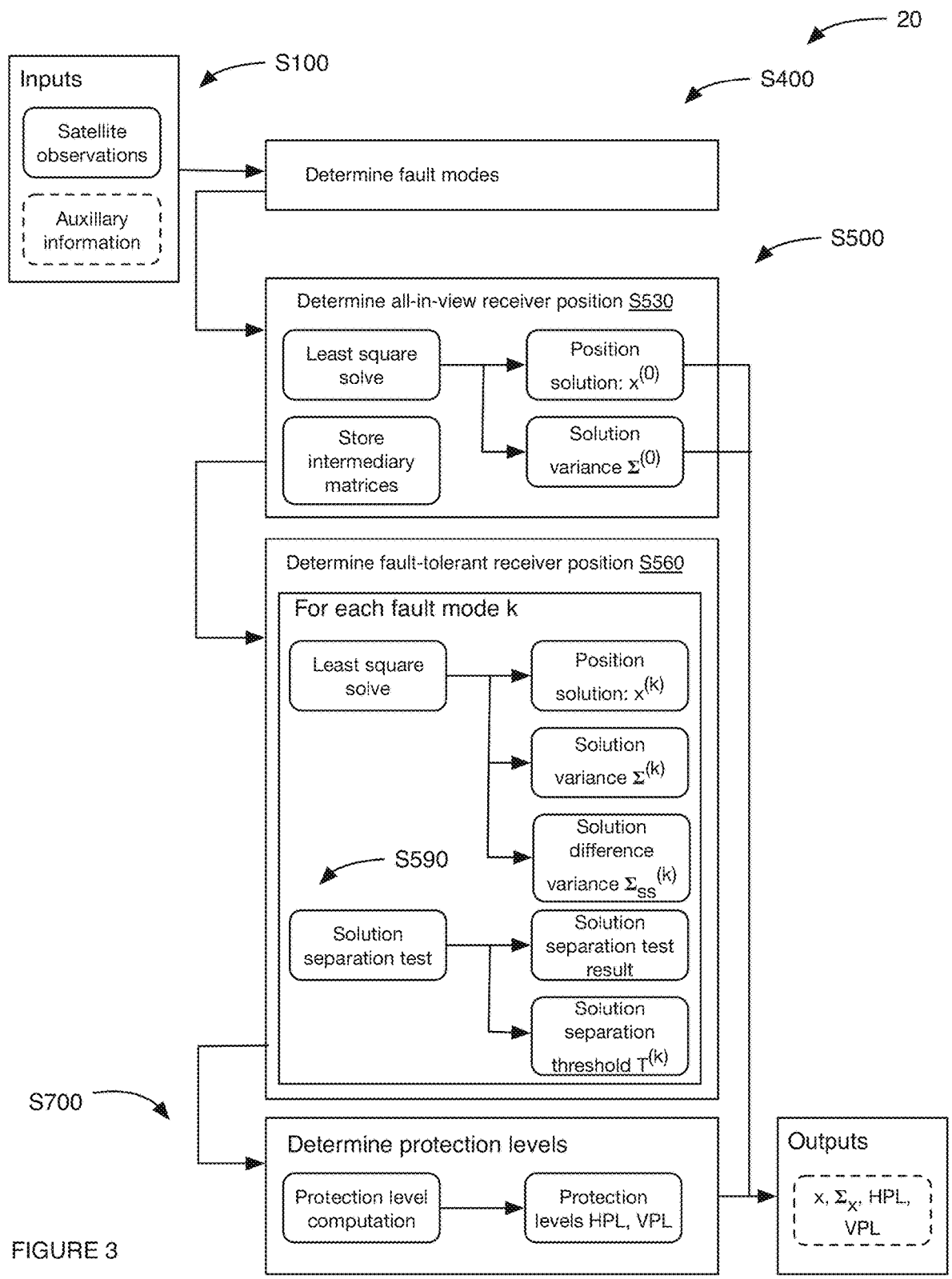
FIG. 3 is a schematic representation of an embodiment of determining fault modes for the satellite observations and determining a fault parameter in the satellite observations.

Determining a fault parameter is preferably performed by the computing system (e.g., a fault observation module of the computing system, of the external system, of the GNSS receiver, of a cloud server, etc.), but can be performed by any component. S500 is preferably performed after S400, but can be performed at the same time as S400. Determining a fault parameter preferably tests (e.g., determines a fault parameter for) every fault mode of the set of fault modes, but can test any subset of and/or suitable fault modes. In variants, as shown for example in FIG. 3, determining a fault parameter can include: determining an all-in-view receiver position S530, determining fault tolerant receiver position S560, determining whether each fault tolerant receiver position is within a predetermined threshold of the all-in-view receiver position S590, and/or any suitable steps.

Determining an all-in-view receiver position S530 functions to determine (e.g., estimate, calculate) a receiver position (and associated variance) based on a set of satellite observations (e.g., received satellite observations, processed satellite observations, fault-mitigated satellite observations, etc.). The receiver position can be determined using a Kalman filter (e.g., recursive Kalman filtering), an extended Kalman filter, a particle filter, MD simulations, a least-squares solution (e.g., an iterative snapshot least-squares method), and/or using any algorithm.

In a specific example, the weighted least-squares method can be defined as:

$$\hat{x} = (G^T W^{(0)} G)^{-1} G^T W^{(0)} y$$

Where G is a geometry matrix (e.g., a matrix with dimension $[n_{sat} \times 3]$, calculated from the actual satellite geometry), W is a weight matrix (e.g., a square matrix with each element corresponding to the reciprocal of the square of a given satellite observations variance, a scaled weight such as based on the probability of a fault in the associated satellite(s), etc.), $\hat{x}$ is the estimated receiver position (e.g., absolute receiver position, relative receiver position such as relative to a previous receiver position, differenced receiver position, etc.), and y is the set of satellite observations (e.g., processed satellite observations, unprocessed satellite observations, differenced satellite observations, etc.). In this specific example, the variance of the receiver position can be $S^{(0)} = (G^T W^{(0)} G)^{-1} G^T W^{(0)}$.

Determining the all-in-view receiver position can optionally include storing one or more pieces of intermediate data (e.g., W, G, $W^{-1}$, $G^{-1}$, $\tilde{A}^{(0)} = G^T W^{(0)} G$, $(\widetilde{A}^{(0)})^{-1}$, etc.).

Determining the fault-tolerant receiver position S560 functions to determine (e.g., estimate, calculate) the receiver position using the sets of satellite observations associated with one or more fault modes. The fault tolerant receiver position can be determined in series and/or in parallel (e.g., for each fault mode, for a subset of fault modes, etc.). The fault-tolerant solutions are preferably determined for each fault mode. However, any subset of fault modes can be used. In a specific example, when the likelihood of a fault having occurred (e.g., the fault parameter) exceeds a threshold, no further fault-tolerant solutions need to be generated. The fault-tolerant receiver positions are preferably determined in the same manner as (e.g., using different satellite observations) the all-in-view receiver position, but can be performed in any manner. In a specific example, the weight matrix used to determine the fault-tolerant receiver position can be $$W_{i,i} = \begin{cases} 0, & \text{if satellite } i \text{ is in fault mode } k \\ W_{i,i}^{(0)}, & \text{otherwise} \end{cases}.$$

In a second specific example such as when the satellite observations are correlated, the weight matrix for the fault tolerant solution can be generated by inverting the weight matrix of the all-in-view solution to obtain the satellite observation covariance matrix, removing the rows and columns corresponding to fault mode k, inverting the resulting matrix to obtain a weight matrix, resizing the transformed weight matrix to the original size (e.g., by adding zeros corresponding to the faulting observations), and proceeding with the fault tolerant position calculation. However, any weight matrix can be used.

Determining the fault-tolerant receiver position preferably includes determining a variance of the difference between each fault-tolerant receiver position and the all-in-view receiver position. In a specific example, the variance of the fault tolerant receiver position can be determined according to $S^{(k)} = (G^T W^{(k)} G)^{-1} G^T W^{(k)}$. In a related specific example, the variance of the difference can be determined according to $\Sigma_{ss}^{(k)} = (S^{(k)} - S^{(0)}) C_{acc} (S^{(k)} - S^{(0)})$ where $\Sigma_{ss}^{(k)}$ is the difference of the variance between fault-tolerant receiver position k and the all-in-view receiver position and $C_{acc}$ is a modified observation covariance matrix.

In some variants, determining the fault-tolerant receiver position can use a rank one update (e.g., the Sherman-Morrison formula) to modify stored intermediate data (e.g., stored during determining the all-in-view receiver position), which can increase the speed of the computations. In a specific example, $\tilde{A}^{(k)}$ can be determined according to $\tilde{A}^{(k)} = \tilde{A}^{(0)} - W_{i,i}^{(0)} g_i g_i^T$ where $g_i$ is the $i^{th}$ column and/or row of the geometry matrix. In this specific example, $$(\widetilde{A}^{(k)})^{-1} = (\widetilde{A}^{(0)})^{-1} - \frac{(\widetilde{A}^{(0)})^{-1} g_i g_i^T (\widetilde{A}^{(0)})^{-1}}{1 + g_i^T (\widetilde{A}^{(0)})^{-1} g_i}.$$

Determining whether each fault tolerant receiver position is within a predetermined threshold of the all-in-view receiver position S590 (and/or determining whether the fault parameter exceeds a threshold) functions to detect whether a fault (e.g., a satellite failure) is likely to have occurred and/or has occurred within the set of satellite observations. The probability of fault occurrence can be determined based on: probability that the fault-tolerant solution exceeds the protection level is greater than $10^{-2}$, $10^{-3}$, $10^{-4}$, $10^{-5}$, $10^{-6}$, $10^{-7}$, $10^{-8}$, $10^{-9}$, 10-10, $10^{-2}$-$10^{-10}$%, etc.; probability of a fault being present is greater than $10^{-2}$, $10^{-3}$, $10^{-4}$, $10^{-5}$, $10^{-6}$, $10^{-7}$, 1%, 5%, 10%, 20%, 30%, 40%, 50%, 60%, 70%, 80%, 90%, 95%, 99%, etc.; probability of a fault exceeds a total integrity risk; probability of a fault exceeds an allocated integrity risk for a given fault; and/or otherwise determined. Determining whether each fault tolerant receiver position is within a predetermined threshold of the all-in-view receiver position is preferably performed by a computing system (e.g., a fault detection module of a computing system), but can be performed by any component. Determining whether each fault tolerant receiver position is within a predetermined threshold of the all-in-view receiver position preferably includes performing a solution separation test, but can additionally or alternatively include performing a p-test, a ratio test, a chi-squared test, and/or any suitable tests.

The solution separation test preferably corresponds to a statistical assessment of each fault-tolerant receiver position compared to the all-in-view receiver position, but can be otherwise defined. The solution separation test is preferably based on a solution separation threshold, but can be based on an absolute value and/or be otherwise defined. The solution separation threshold can be determined according to an equation, using machine learning, heuristically, empirically, based on an application (e.g., a target protection level, an environment that the external system is operating in such as an urban environment vs an open sky environment, etc.), predetermined, and/or otherwise determined. The solution separation threshold can be determined based on the variance of the all-in-view receiver position, the covariance of the all-in-view receiver position, a variance and/or covariance of one or more fault-tolerant receiver positions, a prior solution separation threshold (e.g., associated with a previous epoch), an integrity risk, a total integrity risk, a target integrity, and/or otherwise be determined. The solution separation threshold can be a manifold (e.g., a surface, a volume bounded by a surface, a volume excluded from a surface, etc.), a coordinate frame, a vector space, and/or have any suitable form. For example, the solution separation threshold can define a prismatoid (e.g., rectangular prism), an ellipsoid (e.g., a sphere, a spheroid, a tri-axial ellipsoid, etc.), a homoeoid, a cylinder, a capsule (e.g., sphereocylinder), ovoid, and/or define any suitable volume or have any suitable shape. Generally, when a solution (e.g., an all-in-view receiver position, a fault-tolerant position, etc.) is within the solution separation threshold (e.g., within the surface or volume defined by the solution separation threshold), the solution is considered not likely to be faulty and when the solution is outside of the solution separation threshold, the solution is considered likely to be faulty (e.g., the probability of the solution and/or associated satellites or satellite observations being faulty exceeds a threshold). However, solutions can otherwise be considered faulty or not faulty with respect to the When the difference between each fault-tolerant receiver position and the all-in-view receiver position is less than the solution separation threshold, the fault mode can be accounted for (e.g., in the governing equation), the fault-tolerant receiver position can be not likely faulty (e.g., less than a threshold probability of a fault associated with a satellite or satellite observation), no fault can be detected, and/or the fault mode(s) can otherwise be treated. When the difference between a fault-tolerant receiver position and the all-in-view receiver position is greater than or equal to the solution separation threshold, a fault mode can be detected (and subsequently mitigated and/or identified), the fault mode or associated data can be likely to include a fault, and/or the fault mode can otherwise be treated. However, the solution separation threshold can be otherwise used.

In an illustrative example, the solution separation threshold, $T_q^{(k)}$, can be determined according to $T_q^{(k)} = K_{FA,q} \sigma_{ss,q}^{(k)}$ where $$K_{FA,q} = Q^{-1}\left(\frac{P_{FA,q}}{2N_{fault\_modes}}\right)$$

and can be used as a scaling factor for scaling the variance (and/or covariance) of the receiver position. In a related example, the solution separation test can correspond to $$\frac{|\hat{x}_q^{(k)} - \hat{x}_q^{(0)}|}{T_q^{(k)}} \leq 1.$$

Figure 7:
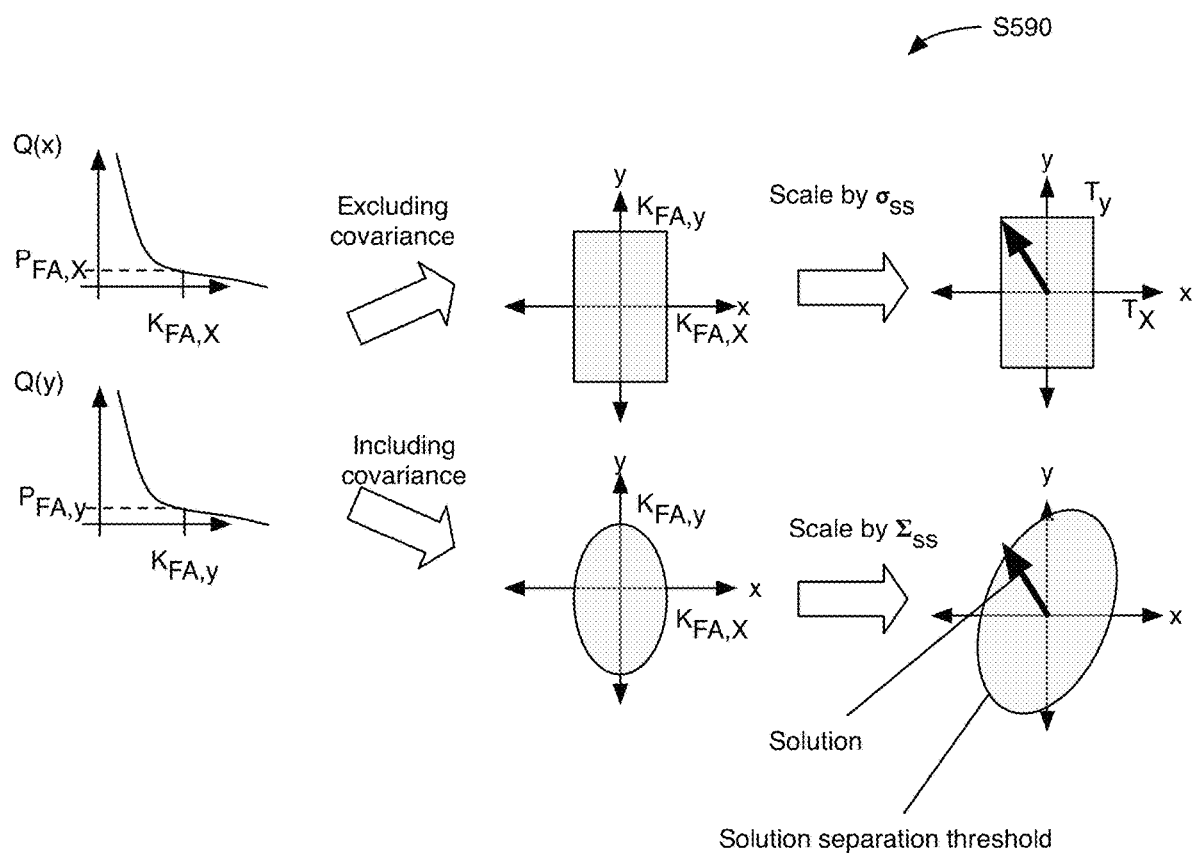
FIG. 7 is a schematic representation of an example of a solution separation threshold excluding and including solution covariances in two dimensions.

In some embodiments, determining whether each fault tolerant receiver position is within a predetermined threshold of the all-in-view receiver position can include correcting for the correlated satellite observations, which can function to determine more accurate protection levels. Correcting for the correlated observations can include accounting for the receiver position covariances (e.g., in addition to the receiver position variance) in the solution separation test (e.g., via the solution separation threshold). As shown for example in FIG. 7, when covariances are excluded, the solution separation or tolerance threshold can define a rectangular space bounded by the threshold in each geometric direction. When covariances are included, the threshold region (e.g., manifold) can become an ellipsoidal region (e.g., asymmetrical ellipsoid, tilted ellipsoid, etc.). As shown for example in FIG. 7, solutions (e.g., fault-tolerant solutions) that can be indicated as acceptable (e.g., identified as not faulty or not likely to be faulty) within a rectangular manifold defining the solution separation threshold (e.g., derived by using all-in-view receiver position variances) can be found to have (or be likely to have) a fault when an ellipsoidal manifold (e.g., derived by using all-in-view receiver position variances and covariances) is used to define the solution separation threshold. Therefore, accounting for solution covariances can be beneficial for representing or producing a more conservative integrity (e.g., compared to using solution variances). In an illustrative example of these embodiments, the solution separation threshold can be $$T_q^{(k)} = K_{FA,q} \sqrt{\sum_{ss,q}^{(k)}}.$$

In related examples, such as where $T_q^{(k)}$ can additionally or alternatively be used as an upper bound for the receiver position error, $T_q^{(k)}$ can be a maximum value of the ellipsoid (e.g., along each axis or coordinate q, the maximum value of the ellipsoid, etc.), determined using principal component analysis, determined using an iterative approach through the ellipsoidal volume, determined using eigenvalue decomposition, determined using single value decomposition, and/or otherwise be determined.

In some variants, determining whether each fault tolerant receiver position is within a predetermined threshold of the all-in-view receiver position can include performing a chi-squared test. The chi-squared test can be performed in addition to and/or instead the solution separation test. In these variants, the chi-squared test is preferably an upper bound for all of the solution separation tests. When the chi-square test fails, the resultant receiver position and associated protection levels can be considered invalid (e.g., even when each solution separation test passes), one or more mitigation steps can be performed, a new set of satellite observations can be received (e.g., the method can be restarted), and/or any suitable response can occur.

Mitigating the effect of faults S600 functions to decrease the effect of fault modes and/or satellite observations associated with satellites and/or satellite constellations that are likely to have (e.g., based on the fault parameter) and/or have faulted on the position solution and the associated protection level when faults are likely and/or detected.

S600 is preferably performed when a fault parameter associated with particular fault mode(s) exceeds a threshold (e.g., a threshold probability). However, S600 can be performed independent of the fault parameters, when a predetermined number or type of fault modes are detected, and/or otherwise be performed responsive to or based on the fault parameters. The threshold can be a predetermined threshold (e.g., 1, 0.1, $10^{-2}$, $10^{-3}$, $10^{-4}$, $10^{-5}$, $10^{-6}$, $10^{-7}$, $10^{-8}$, $10^{-9}$, $10^{-10}$, $10^{-2}$-$10^{-10}$%, etc.), be determined based on the application (e.g., be a smaller threshold for applications that require higher accuracy), be determined based on the probability of a particular fault mechanism, be determined empirically, be determined heuristically, be determined according to an equation, and/or be otherwise determined. When the fault parameter associated with a particular fault mode is less than or equal to a threshold, the method can accommodate any error introduced by the fault mode (e.g., the receiver position determined including the satellite observations within the fault mode will not exceed the protection level). However, any suitable action can occur based on the value of the fault parameter relative to the threshold.

When S600 is performed, the resultant fault-mitigated receiver position can subsequently be used in lieu of the fault-unmitigated receiver position (e.g., in S700), or otherwise used.

Mitigating the effect of faults is preferably performed by a computing system (e.g., a fault mitigation module of the computing system), but can be performed by any component. In variants, mitigating the effect of faults can include: removing one or more satellite observations from the set of satellite observations, applying a weight factor to one or more satellite observations (e.g., apply a smaller weight factor to satellite observations associated with a fault mode, apply a larger weight factor to satellite observations not associated with a faulting satellite, etc.), acquiring additional satellite observations, choosing a new reference satellite and transforming the satellite observations according to the new reference satellite, and/or any suitable mitigation steps. Mitigating the effect of faults is preferably followed by determining a fault parameter for the set of satellite observations where the faults have been mitigated and/or determining fault modes for the set of satellite observations where the faults have been mitigated. However, mitigating the effect of faults can be followed by determining the GNSS receiver position and associated protection level, processing the satellite observations, and/or by any suitable step.

In an illustrative example of S600, a fault mode (and/or associated set of satellite observations) that indicates at least a threshold probability of a satellite fault (e.g., a fault parameter that is at least a threshold value) has occurred can be defined as (e.g., used as) a second all-in-view set of satellite observations (e.g., which can be used to repeat step S400 and S500 with the second all-in-view set of satellite observations).

Determining the GNSS receiver position and associated protection level functions S700 to estimate (e.g., calculate) a receiver position, a residual of the receiver position, and/or a protection level of the receiver position. The receiver position is preferably determined by a computing system (e.g., a positioning module of a computing system, of an external system, of a GNSS receiver, of a cloud computing system, etc.), but can be determined by any component.

The receiver position (and residual) can be the position solution determined by the all-in-view receiver position, the position solution determined by a fault-tolerant solution, determined using ambiguity-resolved carrier phase measurements, calculated relative to a baseline between the receiver and a reference station, and/or otherwise be determined.

The protection level is preferably determined (e.g., calculated, estimated) using a governing equation (e.g., a nonlinear governing equation), but can be determined using machine learning (e.g., a neural network, decision trees, regression analysis, Bayesian networks, etc.), and/or in any manner. The protection level is preferably a conservative protection level (e.g., overestimate of the actual protection level and/or receiver position, to better ensure that the external system can be operated according to target operation parameters, etc.), but can produce an exact and/or aggressive (e.g., underestimate of the actual protection level). The governing equation can be solved using an iterative approach (e.g., an iterative half-step approach), a binary search (e.g., a naïve binary search approach), using an equation (e.g., a closed-form approximation to the governing solution such as an upper or lower bound to the solution), graphically, using machine learning, and/or in any manner.

In a specific example, the governing equation can be given by:

$$2Q\left(\frac{L_q - b_q^{(0)}}{\sigma_q^{(0)}}\right) + \sum_{k=1}^{N_{fault\_modes}} P_{fault}^{(k)} Q\left(\frac{L_q - T_q^{(k)} - b_q^{(k)}}{\sigma_q^{(k)}}\right) = I_q\left(1 - \frac{P_{unmonitored}}{I_{tot}}\right)$$

Where $L_q$ is the protection level associated with axis q (e.g., horizontal axis, vertical axis), $-^{(k)}$ represent quantities associated with fault mode k where k=0 refers to the all-in-view receiver position, Q is a tail probability distribution (e.g., of a zero-mean unit Normal distribution), $\sigma_q$ is a standard deviation of the position solution along axis q, $P_{fault}$ is the probability of a given fault (e.g., determined from a third-party message such as an Integrity Support Message, determined heuristically, determined based on previous measurements, etc.), $T_q$ is the solution separation threshold on axis or coordinate q, $b_q$ is the nominal bias contribution (e.g., a worst case nominal bias contribution) to the position solution on axis or coordinate q (e.g., approximately 0, $b_q^{(k)} = \Sigma_{i=1}^{N_{sat}} |S_{q,i}^{(k)}| b_{nom,i}$ where $S_{q,i}^{(k)}$ is the fit matrix and $b_{nom}$ is a vector of per-observation biases, etc.), $I_{tot}$ is the total integrity budget (e.g., total integrity budget for each axis or coordinate q, total integrity risk for satellite failures, etc.), and $P_{unmonitored}$ is the probability of unmonitored fault modes.

$$Q\left(\frac{L_q - T_q^{(k)} - b_q^{(k)}}{\sigma_q^{(k)}}\right)$$

can, for instance, be the integrity risk (e.g., estimated integrity risk) for a given fault mode k (and can be independently or within during the protection level and/or positioning calculation be determined). However, any governing equation can be used.

In a second specific example, which can be particularly but not exclusively beneficial when position covariances are accounted for (e.g., in S500), the governing equation can be given by:

$$2Q\left(\frac{L_q - b_q^{(0)}}{\sigma_q^{(0)}}\right) + \sum_{k=1}^{N_{fault\_modes}} P_{fault}^{(k)} Q\left(\frac{L_q - T_q^{(k)} - b_q^{(k)}}{\sqrt{\Sigma_{ss,q}^{(k)}}}\right) = I_q\left(1 - \frac{P_{unmonitored}}{I_{tot}}\right)$$

Where $$Q\left(\frac{L_q - T_q^{(k)} - b_q^{(k)}}{\sqrt{\Sigma_{ss,q}^{(k)}}}\right)$$

can be the integrity risk for fault mode k.

In some variations of these specific examples, $T_q$ can be replaced with a maximum value of the threshold's bound along an axis or coordinate (e.g., a maximum value of the manifold's bound in each direction), a value of the threshold in one axis or coordinate when the other axes coordinates are 0 (e.g., the threshold's value along an axis or coordinate), a value of a bounding box that encloses the threshold, and/or any suitable value can be used.

However, any governing equation can be used.

In some embodiments (e.g., as shown for example in FIGS. 8A and 8B), more than one receiver position can be determined. For instance, a receiver position can be determined according to an ARAIM algorithm and a second receiver position can be determined from a baseline vector determined based on the integer ambiguity. When more than one receiver position is determined, the receiver positions can be used to validated and/or verify the results (e.g., compared to one another), a preferred value can be used (e.g., a receiver position associated with a preferred determination method can be used), a receiver position with an associated integrity can be used, an average (or other combination of) the receiver positions can be used, a receiver position can be selected (e.g., by voting), and/or any suitable receiver position can be used.

In variants, the receiver position and/or protection level can be transmitted to an external system, stored (e.g., cached), used to operate and/or control an external system, used to generate external system operation instructions (e.g., turn, accelerate, decelerate, acquire data, etc.), and/or used in any manner.

Figure 6:
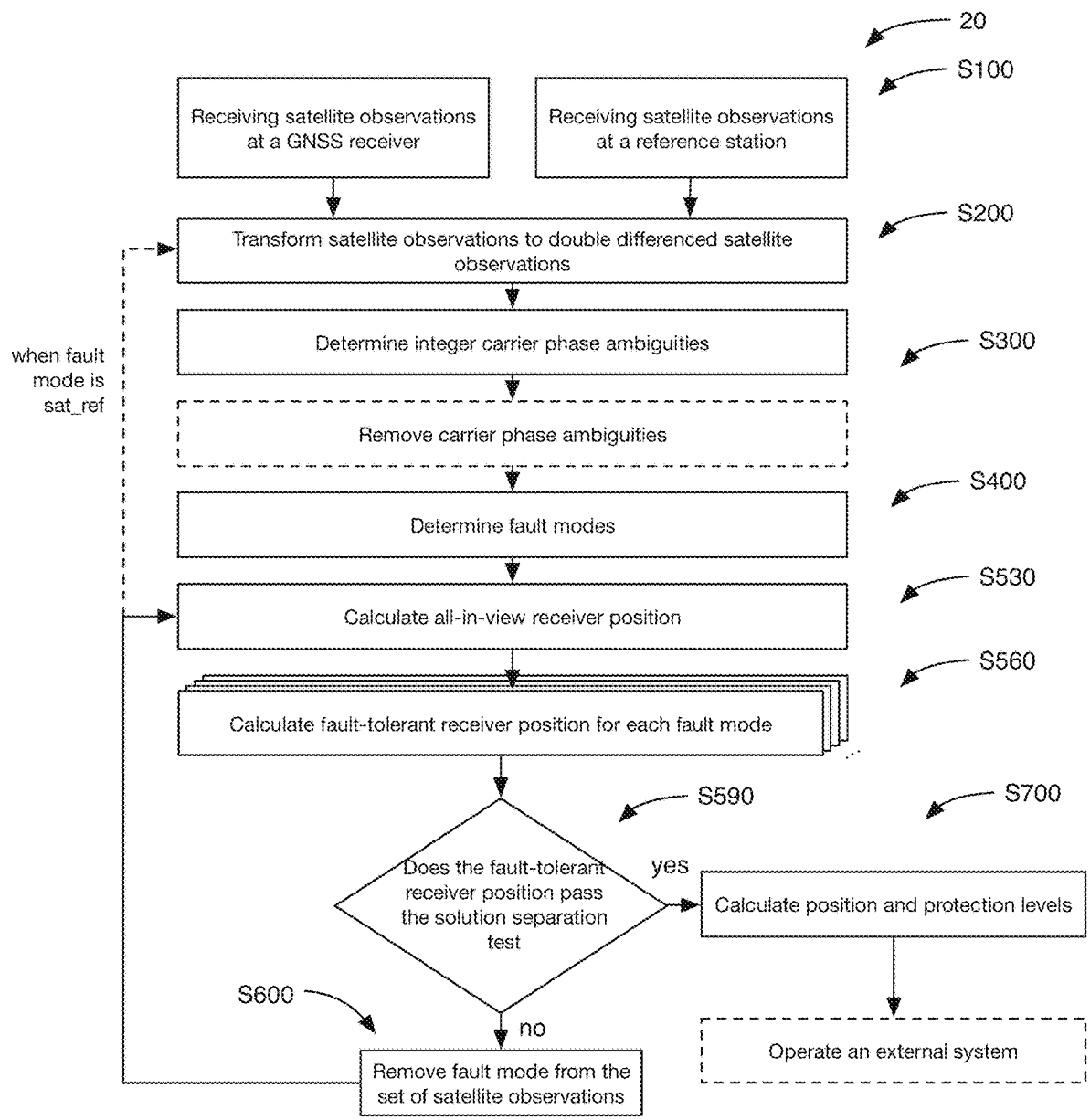
FIG. 6 is a schematic representation of an example of the method.

In a specific example as shown in FIG. 6, the method can include: at a GNSS receiver, receiving a set of satellite observations; at a reference station, receiving a set of satellite observations; transforming the satellite observations to a set of double differenced satellite observations; determining integer carrier phase ambiguities; removing the integer carrier phase ambiguities from the double differenced satellite observations; determining a set of fault modes; calculating an all-in-view receiver position; calculating a fault tolerant solution for each fault mode; when the fault tolerant receiver position(s) pass a solution separation test, estimating the receiver position and protection levels; when a fault tolerant solution does not pass the solution separation test, removing the corresponding fault mode from the double differenced satellite observations and repeating the calculation of the all-in-view receiver position with the updated double differenced satellite observations. In variations of this specific example, when the reference satellite that was used to calculate the differenced satellite observations for a particular fault mode is itself assumed to fault, a new set of double-differenced satellite observations can be determined without the reference satellite and/or with a different satellite as the reference satellite, and the method repeated using the new set of double-differenced satellite observations. However, the method can be otherwise performed.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for determining a receiver position comprising:
   receiving a set of satellite carrier phase observations from a set of satellites;
   receiving a set of reference observations from a set of reference stations;
   determining double-differenced observations based on the set of satellite carrier phase observations and the set of reference observations;
   estimating an all-in-view position of the receiver by processing the double-differenced observations using a snapshot least-squares calculation;
   determining a set of fault modes, where each fault mode is associated with between one and N potentially faulty satellites, where N is a number of satellites in view of the receiver, wherein each fault mode is associated with a subset of the double-differenced observations with the potentially faulty satellites excluded;

for each fault mode:
  determining a fault-tolerant position of the receiver by processing the double-difference observations in the respective fault mode;
  comparing the all-in-view position and the fault tolerant position of the receiver;

when the all-in-position and the fault tolerant position of the receiver for each fault mode are within a solution separation threshold that depends on the covariances of the all-in-view receiver position, calculating a protection level associated with the all-in-view position of the receiver; and when the all-in-view position and the fault tolerant position of the receiver for a fault mode differ by more than the solution separation threshold, determining a second set of double-differenced satellite observations that excludes observations associated with the potentially faulty satellites of the fault mode.

2. The method of claim 1, wherein the protection level is calculated based on the covariances of the all-in-view receiver position.

3. The method of claim 1, further comprising determining an integrity risk for each fault mode, wherein the integrity risk is determined based on the covariances.

4. The method of claim 3, wherein determining the integrity risk comprises bounding a solution separation vector with a maximum bound on the solution separation threshold.

5. The method of claim 1, further comprising determining operation instructions for a vehicle based on the all-in-view receiver position, wherein the receiver is mounted to the vehicle.

6. A method for determining a receiver position comprising:
  receiving satellite observations from a set of satellites;
  receiving reference observations from a set of reference receivers;
  determining differenced observations based on the satellite observations and the reference observations;
  determining an all-in-view position of the receiver based on the differenced observations;
  determining a set of fault modes, each associated with a subset of the differenced observations, wherein each subset of the differenced observations excludes differenced observations associated with a distinct set of potentially faulty satellites;
  for a fault mode of the set of fault modes, determining a fault-tolerant position of the receiver using the subset of differenced observations associated with the fault mode; and
  when the all-in-view position and the fault tolerant position of the receiver for each fault mode are within a solution separation threshold, calculating a protection level associated with the all-in-view position of the receiver.

7. The method of claim 6, further comprising, when the all-in-view position and the fault tolerant position of the receiver differ by more than the solution separation threshold, determining a second set of differenced satellite observations that excludes observations associated with the potentially faulty satellites associated with the fault mode, wherein the receiver position is determined based on the second set of differenced satellite observations.

8. The method of claim 7, further comprising: when the potentially faulty satellites comprises a reference satellite, determining the second set of differenced observations using a second reference satellite.

9. The method of claim 7, wherein the second set of differenced satellite observations are determined by transforming the satellite observations using a transformation matrix formed from the intersection of a differencing matrix and an identity matrix that excludes satellite observations associated with potentially faulty satellites.

10. The method of claim 9, wherein the transformation matrix transforms the satellite observations to a second differenced observations set that is distinct from the differenced observations.

11. The method of claim 6, wherein the solution separation threshold depends on variances and covariances of the all-in-view receiver position.

12. The method of claim 6, wherein the difference observations comprise double-differenced observations.

13. The method of claim 6, wherein the all-in-view receiver position using a snapshot least-squares calculation.

14. The method of claim 6, wherein each set of potentially faulty satellites comprises at most a maximum number of potentially faulty satellites based on a probability that the maximum number of potentially faulty satellites have contemporaneous faults.

15. The method of claim 6, wherein the satellite observations consist of satellite carrier phase data.

16. The method of claim 6, wherein the difference observations are determined based on only satellite observations associated with resolved integer ambiguities.

17. The method of claim 16, wherein integer ambiguities are resolved by:
  determining a set of float phase ambiguities associated with the difference observations;
  determining a set of integer phase ambiguity hypotheses using an integer search algorithm; and
  selecting an integer phase ambiguity of the set of integer phase ambiguity hypotheses based on results of a hypothesis test comparing integer phase ambiguities of the set of integer phase ambiguity hypotheses.

18. The method of claim 6, wherein the satellite observations and the reference observations are received during a first epoch, the method further comprising:
  during a second epoch, receiving a second set of satellite observations from a second set of satellites;
  during the second epoch, receiving a second set of reference observations from a second set of reference receivers;
  determining a second all-in-view position of the receiver based on the second set of satellite observations and the second set of reference observations;
  determining a second set of fault modes and a second fault-tolerant position of the receiver associated with a fault mode of the second set of fault modes; and
  when the second all-in-view position and the second fault tolerant position are within the solution separation threshold, calculating a second protection level associated with the all-in-view position of the receiver.

19. The method of claim 18, wherein the second set of fault modes is independent of the set of fault modes.

20. The method of claim 6, further comprising determining operation instructions for a vehicle based on the all-in-view receiver position, wherein the receiver is mounted to the vehicle.

\* \* \* \* \*